United States Patent
Tan et al.

(10) Patent No.: US 11,625,084 B2
(45) Date of Patent: Apr. 11, 2023

(54) METHOD OF OPTIMIZING DEVICE POWER AND EFFICIENCY BASED ON HOST-CONTROLLED HINTS PRIOR TO LOW-POWER ENTRY FOR BLOCKS AND COMPONENTS ON A PCI EXPRESS DEVICE

(71) Applicant: Intel Corporation, Santa Clara, CA (US)

(72) Inventors: Kuan Hau Tan, Coquitlam (CA); Anoop Mukker, Folsom, CA (US); Ang Li, Coquitlam (CA); Wai Ben Lin, Vancouver (CA); Arash Talebi, Vancouver (CA)

(73) Assignee: Intel Corporation, Santa Clara, CA (US)

( * ) Notice: Subject to any disclaimer, the term of this patent is extended or adjusted under 35 U.S.C. 154(b) by 694 days.

(21) Appl. No.: 16/542,253

(22) Filed: Aug. 15, 2019

(65) Prior Publication Data

US 2019/0369703 A1 Dec. 5, 2019

(51) Int. Cl.
*G06F 1/3215* (2019.01)
*G06F 3/06* (2006.01)
(Continued)

(52) U.S. Cl.
CPC .......... *G06F 1/3215* (2013.01); *G06F 3/0625* (2013.01); *G06F 3/0634* (2013.01);
(Continued)

(58) Field of Classification Search
CPC .... G06F 1/3215; G06F 3/0625; G06F 3/0634; G06F 3/0659; G06F 13/1668; G06F 13/4204; G06F 2213/0026
See application file for complete search history.

(56) References Cited

U.S. PATENT DOCUMENTS

| 5,925,134 A | * | 7/1999 | Solomon | G06F 1/3253 713/324 |
| 6,651,172 B1 | * | 11/2003 | Yu | G06F 9/4411 714/36 |

(Continued)

OTHER PUBLICATIONS

"NVIDIA GPUDirect Enhancing Data Movement and Access for GPUs", NVIDIA GPUDirect®, (http://developer.nvidia.com), Copyright © 2022 NVIDIA Corporation, 5 pages.

(Continued)

*Primary Examiner* — Vincent H Tran
(74) *Attorney, Agent, or Firm* — Compass IP Law PC

(57) ABSTRACT

Methods and apparatus for optimizing device power and efficiency based on host-controlled hints prior to low-power entry for PCI Express blocks and components. Data structures containing low-power state capability information mapping one or more fine-grained low-power states for each of at least one of an L0s, L1, L1.1, and L1.2 PCIe-defined low-power state are stored on a PCIe device coupled to a Host via a PCIe link. Messages are exchanged over the PCIe link between the Host and PCIe device to configure, using the low-power state capability information, blocks and/or components on the PCIe device to enter a fine-grained low-power state instead of an associated PCIe-defined low-power state mapped to the fine-grained low-power state when the PCIe device detects a power-change event or receives a command to enter the associated PCIe-defined low-power state. Sequences of power-level changes between multiple fine-grained low-power states may also be implemented.

25 Claims, 20 Drawing Sheets

(51) Int. Cl.
G06F 13/42 (2006.01)
G06F 13/16 (2006.01)

(52) U.S. Cl.
CPC .......... G06F 3/0659 (2013.01); G06F 3/0679 (2013.01); G06F 13/1668 (2013.01); G06F 13/4204 (2013.01); *G06F 2213/0026* (2013.01)

(56) References Cited

U.S. PATENT DOCUMENTS

| | | | | |
|---|---|---|---|---|
| 6,802,014 | B1* | 10/2004 | Suurballe | G06F 1/3287 |
| | | | | 700/286 |
| 8,766,993 | B1* | 7/2014 | Hobbs | G06F 3/14 |
| | | | | 345/538 |
| 2006/0184809 | A1* | 8/2006 | Kojou | G06F 1/3203 |
| | | | | 713/300 |
| 2007/0143637 | A1* | 6/2007 | Tsai | G06F 1/325 |
| | | | | 713/300 |
| 2009/0327774 | A1* | 12/2009 | Jeyaseelan | G06F 1/325 |
| | | | | 710/316 |
| 2013/0007483 | A1* | 1/2013 | Diefenbaugh | G06F 1/325 |
| | | | | 713/320 |
| 2015/0220140 | A1* | 8/2015 | Por | G06F 1/266 |
| | | | | 710/314 |
| 2015/0370315 | A1* | 12/2015 | Unnikrishnan | G06F 1/3296 |
| | | | | 713/323 |
| 2018/0004273 | A1* | 1/2018 | Leucht-Roth | G06F 1/3209 |
| 2018/0181407 | A1* | 6/2018 | Rothman | G06F 1/3296 |
| 2019/0064909 | A1* | 2/2019 | Bito | G06F 1/325 |
| 2019/0227725 | A1* | 7/2019 | Afriat | G06F 3/0625 |
| 2019/0235612 | A1* | 8/2019 | Li | G06F 1/3215 |
| 2019/0340146 | A1* | 11/2019 | Chen | H03K 5/2481 |

OTHER PUBLICATIONS

Gribble, Christiann, "Cluster-Based Interactive Volume Rendering with Simian", School of Computing, University of Utah, Salt Lake City, UT 84112 USA, Sep. 3, 2003, 7 pages.

Murph, D., "Bigfoot Networks revealGPU / NIC combo card, talks up motherboard integrationand WiFi", engadget, https://www.engadget.com/2010-06-03-bigfoot-networks-reveal-gpu-nic-combo-card-talk-up-motherboar.html, Jun. 3, 2010, 9 pages.

* cited by examiner

Table 1

| PCIe Defined low power states | Fine-grained low power states (RO) | Exit Latency Scale needed to be functional(Scale*Value) (RO) | | Power consumed in the state (mw) (RO) | lower-power state auto-migration timer(μs)(RO) |
|---|---|---|---|---|---|
| | | Scale (00:ns; 01:μs; 10:ms) | Value | | |
| L0s | PCIe_L0s_state_1 | 00b | 400d | 100d | 2d |
| | PCIe_L0s_state_2 | 00b | 1200d | 50d | 10d |
| L1 | PCIe_L1_state_1 | 01b | 2d | 30d | 30d |
| | PCIe_L1_state_2 | 01b | 4d | 10d | 50d |
| | PCIe_L1_state_3 | 01b | 8d | 5d | 0d (no migration) |
| L1.1 | ... | ... | ... | ... | ... |
| L1.2 | PCIe_L1.2_substate_1 | 10b | 1d | 40 | 500d |
| | PCIe_L1.2_substate_2 | 10b | 8d | 5 | 0d (no migration) |

Table 2

| Fine-grained low power states select index (R/W) | lower-power state auto-migration enable (R/W) |
|---|---|
| 0000b (PCIe_L0s_state_1) (default) | 1b |
| 0001b (PCIe_L0s_state_2) | 1b |
| 0010b (PCIe_L1_state_1) (default) | 1b |
| 0011b (PCIe_L1_state_2) | 0b |
| 0100b (PCIe_L1_state_3) | 0b |
| ..... | ... |
| 1000b (PCIe_L1.2_substate_1) | 1b |
| 1001b (PCIe_L1.2_substate_2) (default) | 0b |

Table 2

Component A

| Fine-grained low power states select index (R/W) | lower-power state auto-migration enable (R/W) | Active |
|---|---|---|
| 0000b (PCIe_L0s_state_1) (default) | 1b | 1 |
| 0001b (PCIe_L0s_state_2) | 1b | 0 |
| 0010b (PCIe_L1_state_1) (default) | 1b | 0 |
| 0011b (PCIe_L1_state_2) | 0b | 0 |
| 0100b (PCIe_L1_state_3) | 0b | 1 |
| ... | ... | ... |
| 1000b (PCIe_L1.2_substate_1) | 1b | 0 |
| 1001b (PCIe_L1.2_substate_2) (default) | 0b | 1 |

Component B

| Fine-grained low power states select index (R/W) | lower-power state auto-migration enable (R/W) | Active |
|---|---|---|
| 0000b (PCIe_L0s_state_1) (default) | 1b | 0 |
| 0001b (PCIe_L0s_state_2) | 1b | 1 |
| 0010b (PCIe_L1_state_1) (default) | 1b | 0 |
| 0011b (PCIe_L1_state_2) | 0b | 1 |
| 0100b (PCIe_L1_state_3) | 0b | 0 |
| ... | ... | ... |
| 1000b (PCIe_L1.2_substate_1) | 1b | 0 |
| 1001b (PCIe_L1.2_substate_2) (default) | 0b | 1 |

| Name | Code[7:0] (b) | Routing r[2:0] (b) | Support RC / Ep / Sw / Br | Description/Comments |
|---|---|---|---|---|
| Vendor_Defined Type 0 | 0111 1110 | 000, 010, 011, 100 | See Note 1. | Triggers detection of UR by Completer if not implemented. |
| Vendor_Defined Type 1 | 0111 1111 | 000, 010, 011, 100 | See Note 1. | Silently discarded by Completer if not implemented. |

Note 1. Transmission by Endpoint/Root Complex/Bridge is implementation specific. Switches must forward received Messages using Routing r[2:0] field values 00b, 010b, and 011b.

*Fig. 8* (Prior Art)

| | +0 | +1 | +2 | +3 |
|---|---|---|---|---|
| | 7 6 5 4 3 2 1 0 | 7 6 5 4 3 2 1 0 | 7 6 5 4 3 2 1 0 | 7 6 5 4 3 2 1 0 |
| Byte 0 > | Fmt 0 x 1 / Type | R / TC / R / Attr / R / TH | TD / EP / Attr / AT | Length |
| Byte 4 > | Requester ID | Tag | Message Code— Vendor_Defined |
| Byte 8 > | Bus Number / Device Number / Function Number / Reserved | | Vendor ID |
| Byte 12 > | (For Vendor Definition) | | | |

*Fig. 9a* (Prior Art)

| | +0 | +1 | +2 | +3 |
|---|---|---|---|---|
| | 7 6 5 4 3 2 1 0 | 7 6 5 4 3 2 1 0 | 7 6 5 4 3 2 1 0 | 7 6 5 4 3 2 1 0 |
| | Fmt 0 x 1 / Type | R / TC / R / Attr / LN / TH | TD / EP / Attr / AT 0 0 | Length |
| | Requester ID | Tag | Message Code 0111 1111 |
| | Destination ID if ID Routed; otherwise Reserved | | Vendor ID (8888) (8888) (8888) (8888) |
| | Subtype | (For PCI-SIG-Defined VDM Definition) | |

*Fig. 9b* (Prior Art)

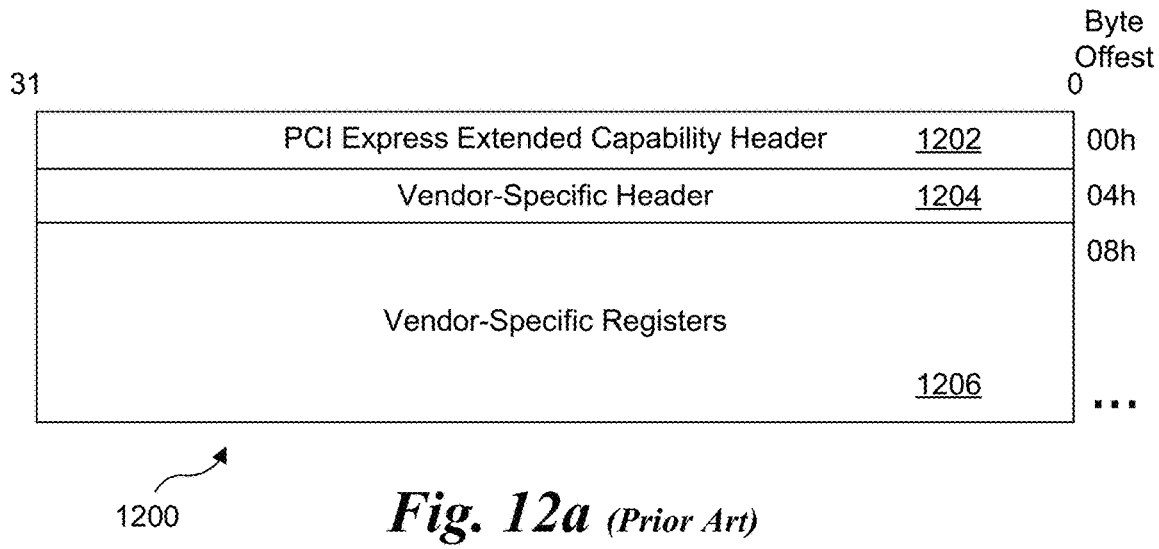

Fig. 12a *(Prior Art)*

| Bit Location | Register Description | Attributes |
|---|---|---|
| 15:0 | PCI Express Extended Capability ID – This field is a PCI-SIG defined ID number that indicates the nature and format of the Extended Capability. Extended Capability ID for the Vendor-Specific Extended Capability is 000Bh. | RO |
| 19:16 | Capability Version – This field is a PCI-SIG defined version number that indicates the version of the Capability structure present. Must be 1h for this version of the specification. | RO |
| 31:20 | Next Capability Offset – This field contains the offset to the next PCI Express Capability structure or 000h if no other items exist in the linked list of Capabilities. For Extended Capabilities implemented in Configuration Space, this offset is relative to the beginning of PCI-compatible Configuration Space and thus must always be either 000h (for terminating list of Capabilities) or greater than 0FFh. | RO |

Fig. 12b *(Prior Art)*

| Bit Location | Register Description | Attributes |
|---|---|---|
| 15:0 | VSEC ID – This field is a vendor-defined ID number that indicates the nature and format of the VSEC structure.<br>Software must qualify the Vendor ID before interpreting this field. | RO |
| 19:16 | VSEC Rev – This field is a vendor-defined version number that indicates the version of the VSEC structure.<br>Software must qualify the Vendor ID and VSEC ID before interpreting this field. | RO |
| 31:20 | VSEC Length – This field indicates the number of bytes in the entire VSEC structure, including the PCI Express Extended Capability header, the Vendor-Specific header, and the Vendor-Specific registers. | RO |

1204

*Fig. 13* (Prior Art)

METHOD OF OPTIMIZING DEVICE POWER AND EFFICIENCY BASED ON HOST-CONTROLLED HINTS PRIOR TO LOW-POWER ENTRY FOR BLOCKS AND COMPONENTS ON A PCI EXPRESS DEVICE

BACKGROUND INFORMATION

Peripheral Component Interconnect Express, also known as PCI Express or PCIe is a high-speed serial interconnect that is widely used in today's computers and servers. PCI Express has evolved over several generations, with the third generation of PCI Express (also referred to as Gen 3) currently being the most common, and the fourth generation (Gen 4) and fifth generation (Gen 5) being recently introduced. The PCI Express 3.0 Base Specification, revision 3.0 was published by PCI-SIG® in November 2010. The PCI Express 3.1 Specification, was released in November 2014. PCI Express 4.0 was announced in June 2017 by PCI-SIG®. The most-recent version, PCI Express Base Specification Revision 5.0, Version 1.0 was released on May 28, 2019.

Under the foregoing PCI Express Specifications, there are only a few low-power states defined, namely L0s, L1 (including L1 substates), L2, and L3. In contrast, many of the current advanced client/enterprise storage systems may support finer power-saving state granularity than this limited set of low-power states. For example, some of today's PCIe devices may be equipped with advanced digital or mixed-signal processing logic (e.g., SERDES) that can provide two to three sub-power-states for each "coarse" low-power state defined in the PCIe Specification. However, since the PCIe functionality defined in a host follows the PCIe Specification(s), the host will not be able to leverage those devices' sub-power-state features efficiently for more optimized power and performance trade-off within a certain PCIe-defined low-power states.

In a system interconnected by a PCIe hierarchy, most of the communication between devices depends on the readiness of the PCIe physical link (in the L0 state). Generally, once the link is settled in certain PCIe-defined non-L0 low-power states, the time needed to exit low-power state and enter L0 state for the next communication is substantially fixed. Although certain devices enabled with both L0s and L1 can choose to migrate from the L0s state to the L1 state, due to the lack of system-level context, this device-arbitrary migration may impact system performance from time to time. For example, if L0s exiting is needed for newly scheduled transportation immediately after the device chooses to enter the L1 state from the L0s state, more time would be needed to establish L0 from L1 exiting compared with an L0s→L0 state transition.

In summary, the limited low-power architecture options defined in the PCIe Specifications has been a hindering factor to enable more sophisticated system policies for power and performance optimization.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 4 is a diagram illustrating a format for a low-power state capability table or data structure, according to one embodiment;

FIG. 5a is diagram illustrating a table or data structure including low-power state configuration registers that are used to define the current fine-grained power states to be entered in place of the PCIe defined low-power states, according to one embodiment;

FIG. 5b is diagram illustrating a table or data structure including low-power state configuration registers that are used to define the current fine-grained power states to be entered in place of the PCIe defined low-power states for each of multiple components, according to one embodiment;

FIG. 8 is a table specifying aspects of a Vendor Defined Message (VDM), as defined in the PCIe 4.0 Specification;

FIG. 9a is a diagram defining the header format of a VDM;

FIG. 9b is a diagram illustrating the PCI-SIG-Defined VDM header format;

FIG. 12a is a diagram illustrating the allocation of register fields in a Vendor-Specific Extended Capability (VSEC) structure, as defined by the PCIe 4.0 Specification;

FIG. 12b is a table defining fields in a PCI Express Extended Capability Header, as defined by the PCIe 4.0 Specification;

FIG. 13 is a table defining fields for a VSEC vendor-specific header, as defined by the PCIe 4.0 Specification;

DETAILED DESCRIPTION

Figure 1:
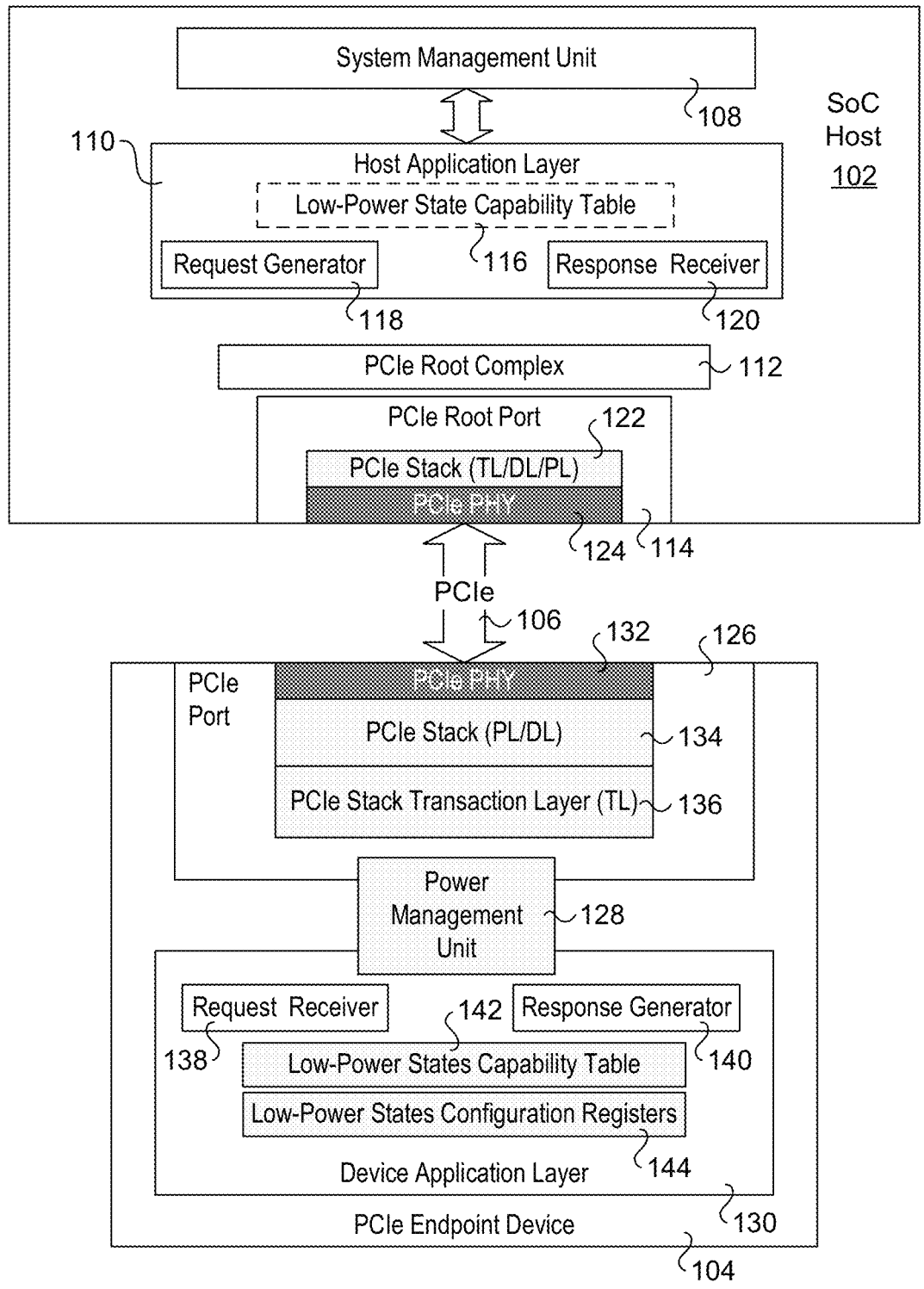
FIG. 1 is a diagram of a system architecture that may be used to implement host-controlled hints prior to low-power entry for a PCIe device or component, according to one embodiment.

Embodiments of methods and apparatus for optimizing device power and efficiency based on host-controlled hints prior to low-power entry for PCI Express blocks and components are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

In accordance with aspects of the embodiments described and illustrated herein, techniques are provided for extended low-power states currently defined by PCIe standards to include one or more fine-grained low-power state to be used in place of one or more of the PCIe-defined low-power states. The techniques and associated mechanism provide a Host with hardware-autonomous control of when, how and which low-power states/substates a PCIe devices (the Device) capable of supporting one or more fine-grained low-power states should enter or schedule to enter. The Host is also armed with potential information regarding internal state of the Device so the Host can factor in Device states when making system optimization decisions. The approach includes mapping the Device-supported fine-grained low-power states to detail power-mode parameter settings or more sophisticated power-mode migration sequence, so that the Device can follow hints from Host after entering the next scheduled low-power state.

To support the foregoing functionality, handshake and/or exploration mechanisms between the Host and Device are implemented to convey related control/status information. Various schemes may be employed to facilitate the mechanisms, including in-band (TLP-based) mechanisms, such as Vendor Defined Message (VDM), Special Memory Read/Write targeting particular Memory-Mapped IO (MMIO) spaces, Configuration Read/Write Requests targeting Vendor-Specific Extended Capability (VSEC) or Designated Vendor-Specific Extended Capability (DVSEC), etc. In addition, out-of-band mechanisms (with extra sideband signals) may be employed to facilitate the exchange of messages and information between the Host and PCIe device.

In one aspect, a Host such as a System on a Chip (SoC) host and PCIe device employ an application layer agreement on how low-power related information is packaged via a set of standard PCIe Transaction Layer Protocol (TLP) packets. Generally, the TLPs described and illustrated herein are non-limiting examples of TLPs that may be used to facilitate communication between a Host and PCIe device; persons having skill in the PCIe art will recognize that other TLPs may be used to convey similar information.

In one embodiment there are generally two types of Host request TLPs, including:

LP_CFG_RD_REQ (Low-Power Configuration Read Request; no payload): used to read a "Low-Power State Capability" table/data structure," an example of which is shown in FIG. 4; and LP_CFG_WR_REQ (Low-Power Configuration Write Request; with payload): used to configure registers associated with the "Low-Power State Capability" table to enable selection and implementation of fine-grained power state while maintaining compliance with power control mechanisms defined for standard PCIe low-power states.

From the PCIe device point of view, several kinds of responses are architected as an example to illustrate the mechanism, including:

LP_CFG_RD_RSP (Low-Power Configuration Read Response; with payload): used to respond to LP_CFG_RD_REQ TLPs with information read from the Low-Power State Capability table/structure; and LP_CFG_WR_RSP (Low-Power Configuration Write Response; no payload): used to respond to LP_CFG_WR_REQ TLPs regarding whether the configuration change initiated from the Host is successful or not FIG. 1 shows a system architecture 100 that may be used to implement host-controlled hints prior to low-power entry for a PCIe device or component, according to one embodiment. System architecture 100 includes host SoC host 102 linked in communication with a PCIe endpoint device 104 via a PCIe link 106. Generally, PCIe link 106 represents a PCIe link defined under a PCIe 3.x or later specification, and may employ any lane width defined in such a specification, such as x2, x4, x8, x16, x32, etc. In addition, PCIe link 106 may operate an any speed defined by a PCIe 3.x or later specification.

SoC host 102 includes a system management unit 108, a host application layer 110, a PCIe root complex (RC) 112 and a PCIe root port 114. Host application layer 110 includes a copy of a low-power state capability table 116, a request generator 118, and a request receiver 120. PCIe root port 114 includes a standard PCIe stack 122, including a transaction layer (TL), a data link layer (DL), and a physical layer (PL), and a PCIe Physical Layer (PHY) 124.

PCIe endpoint device 104 includes a PCIe port 126, a power management unit 128, and a device application layer 130. PCIe port 126 includes a PCIe PHY 132 and a standard PCIe stack that is shown split between PCIe PL and DL layers 134 and a PCIe transaction layer 136. Device application layer 130 includes a request receiver 138, a request generator 140, a low-power states capability table 142, and low-power states configuration registers 144.

In some embodiments, host application layer 110 may be implemented in PCIe root port 114, while in other embodiments host application layer 110 may be implemented in a separate block that is in communication with PCIe root port 114. Similarly, in some embodiments device application layer 130 may be implemented in PCIe port 126, while in other embodiments device application layer 130 may be implemented in a block that is in communication with PCIe port 126.

Generally, the request and response generators disclosed herein, such as request generator 118 and response generator 140 are components implemented in a Host or Device application layer (as applicable) and configured to compose TLPs (as described and illustrated herein) and present the TLPs to the standard PCIe Transaction layers for transmission. Similarly, the request and response receivers, such as request receiver 138 and response receiver 120, are components implemented in a Host or Device application layer and configured to receive TLPs from a standard PCIe Transaction layer, parse (and if needed, decipher or decrypt) them, and notify and/or interact with associated blocks. In some instances, request and response generators may employ optional encryption for all or a portion of message payload, while request and response receivers may likewise employ optional decryption to decode the encrypted message content.

The Power Management Unit (PMU) in the Device (e.g., PMU 128) oversees all device layers and controls power management aspects of various entities on the Device, such as the PCIe PHY block. The power management aspects and related mechanisms include but are not limited to power mode settings, power domain switching, clock gating and clock frequency control, etc.

Figure 2A:
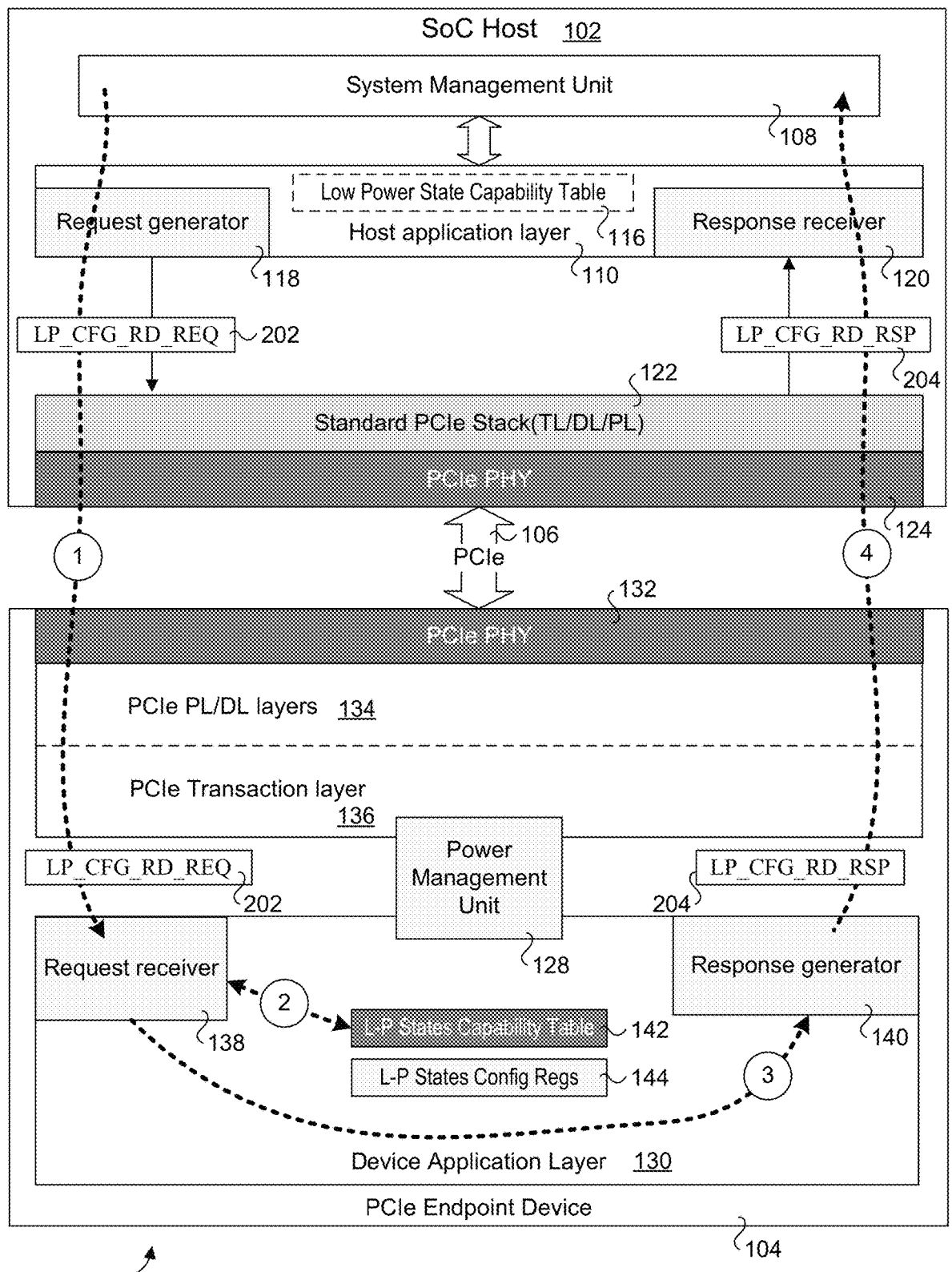
FIG. 2a is a system architecture and message flow diagram illustrating further details of the system architecture of FIG. 1 along with message flows between components for obtaining low-power states capability information, according to one embodiment.
Figure 3:
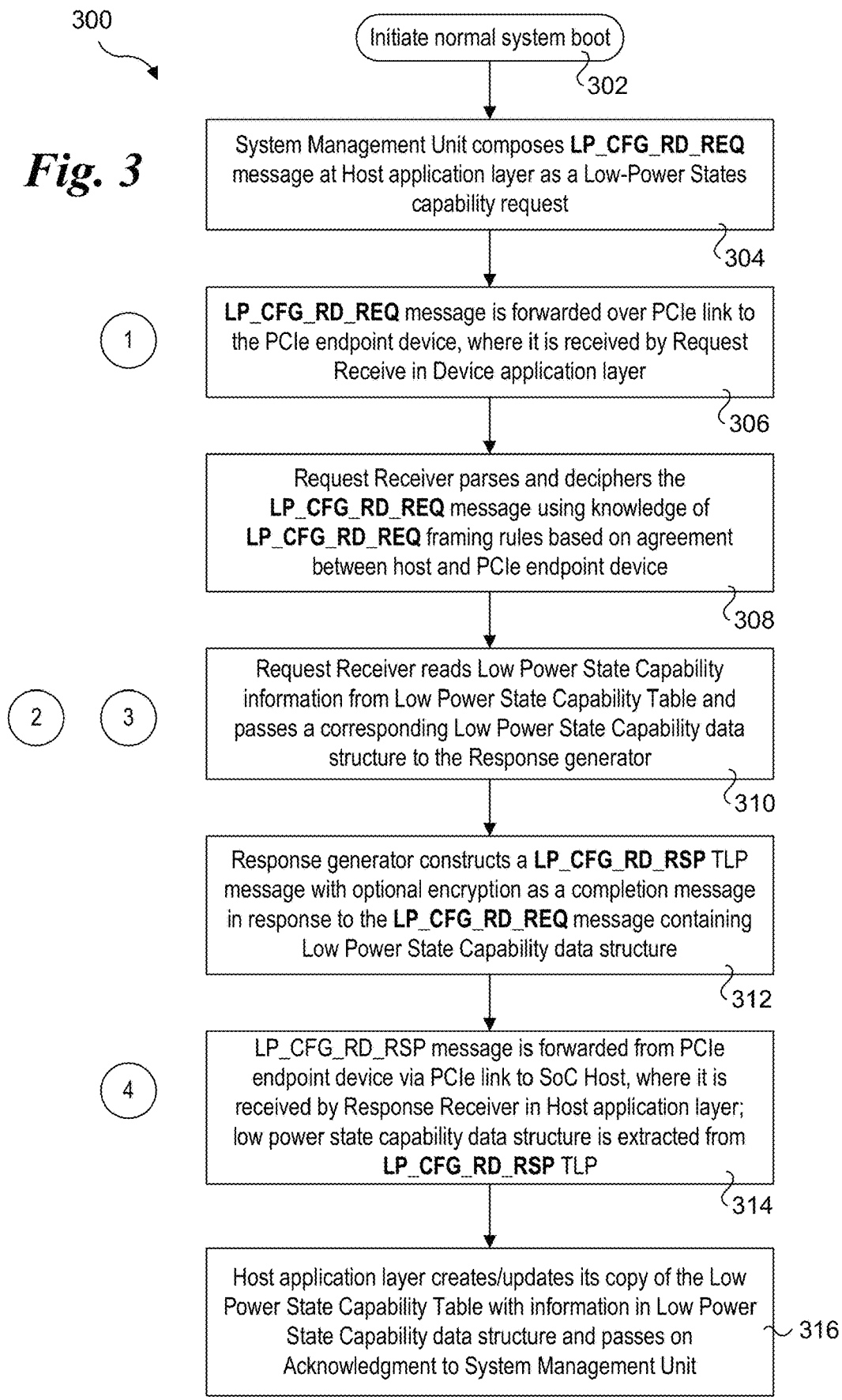
FIG. 3 is a flowchart illustrating operations performed by components in the message flow diagram of FIG. 2a to enable the host to obtain fine-grained low-power capability information from the PCIe endpoint device, according to one embodiment.

FIG. 2a shows message flows between selected components of architecture 100 that are used to enable a host to obtain fine-grained low-power capability information from a PCIe endpoint device, while corresponding operations for effecting this functionality are shown in a flowchart 300 of FIG. 3. The process begins in a start block 302 in which a normal system boot is initiated. During the normal system boot, System Management Unit 108 (e.g., system BIOS or CPU Punit) starts exploring the proposed "low-power states capability" at the device side by composing a LP_CFG_RD_REQ message 202 at host application layer 110 as a low-power states capability request, as depicted in a block 304.

In a block 306, LP_CFG_RD_REQ message 202 is forwarded from request generator 118 over PCIe link 106 to PCIe endpoint device 104 (as depicted by message flow '1'), where it is received by request receiver 138. In a block 308 Request receiver 138 parses and deciphers the LP_CFG_RD_REQ message using its knowledge of the LP_CFG_RD_REQ message framing rules based on an agreement between the host and PCIe endpoint device, as discussed above.

As depicted by message flows '2' and '3' and block 310, request receiver 138 reads low-power state capabilities information from low-power state capability table 142, and passes a corresponding low-power state capability data structure to response generator 140.

An example of one embodiment of a low-power state capability table 142 (also referred to as Table 1) is shown in FIG. 4. The low-power state capability table includes columns 400, 402, 404, 406, 408, and 410. Column 400 lists low-power states defined by the PCIe specifications (e.g., 3.0 and later), referred to herein as "PCIe-defined low-power states." These are conventional PCIe low-power states and include L0s, L1, L1.1, and L1.2. Column 402 contains the new fine-grained low-power states and their associations with a corresponding conventional PCIe low-power state. For example, the two fine-grained low-power states for L0s include PCIe_L0s state_1 and PCIe_L0s_state_2. As further shown, conventional PCIe lower power state L1 includes three fine-grained low-power states, while conventional PCIe lower power state L1.2 includes two fine-grained low-power states. In this example, conventional PCIe lower power state L1.1 does not have fine-grained low-power states; rather, use of PCIe lower power state L1.1 is the same as defined for this state in the PCIe specifications. The inclusion of this L1.1 row is to illustrate that fine-grained low power states may be defined for one or more PCIe-defined low-power states, but need not be defined for each PCIe-defined low-power states. For convenience and point of illustration, textual names for the fine-grained lower power states are described and illustrated herein; in practice, the textual states may/would be replaced by predetermined numerical values or codes.

Columns 404 and 406 are used to specify the exit latency scale that is to be implemented. The exit latency scale is a function of a Scale in column 404 multiplied times a Value in column 406. As shown, in this example the Scales are nanoseconds (ns), microseconds (μs), and milliseconds (ms). The Values in column 406 are depicted as decimal values for illustrative purposes, but, of course, would be stored in binary or hexadecimal format internally in the table data structure. Column 408 further lists the power consumed when operating in each of the corresponding fine-grained lower-power states, in milliwatts (mw).

Table 2 in FIG. 5 shows low-power state configuration registers that are accessible to the Host and which are used to set the fine-grained low-power state or substate to be implemented at the PCIe device. For example, the fine-grained low-power states selected indexes are shown in column 500, while a lower-power state auto-migration enable bit value is shown in column 502. Table 2 also lists several default values, wherein these default values will be used unless the corresponding register values are changed. In one embodiment the default values correspond to the values used for the conventional PCIe low-power state associated which the fine-grained state. For example, "PCIe_L0s_state_1" is a default state corresponding to the PCIe defined low-power state L0s.

In some embodiments a PCIe endpoint device may provide a feature that enables the Host to select to use hardware-based automatic migration to lower proprietary power states, as shown in column 410. If the Host chooses to leave Table as shown, for instance, when the Device enters the PCIe defined L0s state, the PHY block will stay in PHY_L0s_state_1 in 2 μs before auto-migrating to PHY_L0s_state_2, then, in turn, migrate to PHY_L1_state_1 and stay there since the auto-migration enable bit for the PHY_L1 state_1 is '0'.

Returning to flowchart 300, in a block 312 response generator 140 constructs an LP_CFG_RD_RSP TLP message 204 with optional encryption as a completion message in response to the LP_CFG_RD_REQ message containing low-power state capability data structure passed to response generator 140 in message flow '3'. LP_CFG_RD_RSP TLP message 204 is then forwarded from PCIe endpoint device 104 via PCIe link 106 to SoC Host 102, where it is received by response receiver 120 in Host application layer 110, as depicted in a block 314 and by message flow '4'. Response receiver 120 further extracts the low-power state capability data structure from LP_CFG_RD_RSP TLP message 204. The process is then completed in a block 316 in which Host application layer 110 creates/updates its copy of the Low-Power State Capability Table 116 with information in the low-power state capability data structure (extracted from LP_CFG_RD_RSP TLP message 204) and passes on Acknowledgment to system management unit 108.

It is noted that the use of the foregoing process may not be necessary if the Host has pre-existing knowledge of what extended low-power modes the PCIe endpoint device is able to support. For example, during enumeration, the "Subsystem Vendor ID Register" of the PCIe device may be comprehended by the Host as a way to identify the device's capability to support fine-grained low-power states, hence the Host can choose to use default settings or just configure several pre-known configuration registers in Table 2. Also, depending on various devices' capabilities, more parameters may be included into the low-power state capability structure (or similar capability structures), such as options on power voltage, clock gating, clock frequency, etc.

Through use of the foregoing operations and message flows illustrated in FIGS. 2a and 3 or the use of the pre-existing knowledge approach, a Host is enabled to obtain low-power state capability information from a PCIe endpoint device that supports fine-grained low-power states the extend beyond the PCIe-defined low-power states. During ongoing run-time operations of the system, the Host may selectively put the PCIe endpoint device in one of the fine-grained low-power states. Optionally or in addition, the Host may program the PCIe endpoint device to implement a particular fine-grained low-power state in response to a command to operate in an associated conventional PCIe low-power state. An example of processes for implementing this and similar functionality are shown in diagram 200b of FIG. 2b and flowchart 600 of FIG. 6.

The process may be initiated during ongoing run-time operations, as depicted in a start block 602 of flowchart 600. In a block 604, system management unit 108 instructs request generator 118 to compose an LP_CFG_WR_REQ message 206 as a "fine-grained low-power state change request" with the configuration information targeting particular registers amongst the configuration registers exposed to Host in Table 2. Generally, any kind of PCIe TLP that includes a payload portion may be used to convey this information. As shown in a block 606 and depicted by message flow '5', LP_CFG_WR_REQ message 206 is forwarded from request generator 118 over PCIe link 106 to PCIe endpoint device 104, where it is received by request receiver 138 in Device application layer 130.

Upon receipt, request receiver 138 processes LP_CFG_WR_REQ message 206 using knowledge of LP_CFG_WR_REQ framing rules based on the Host/PCIe endpoint agreement, decodes the message to extract the Host fine-grained low-power setting information, and updates an applicable power setting in low-power states configuration registers 144 as depicted by message flow '6'. For example, suppose SoC Host 102 chooses to select the "PCIe_L1_state_3" (b0100) to be implemented for the power mode by PCIe-PHY block 132. In this case, corresponding information would be included in LP_CFG_WR_REQ message 206 to cause a value of the 'b0100' to be written to the register for the PCIe L1 state in low-power states configuration registers 144.

As depicted in a block 610 and message flow '7', the update of the lower power state configuration register triggers power management unit 128 to apply the corresponding power setting to PCIe PHY block 132. As depicted by message flow '8' and a block 612, request receiver 138 notifies response generator 140 to construct an LP_CFG_WR_RSP message 208 with optional encryption as a completion message in response to the LP_CFG_WR_REQ message 206.

In a block 614, response generator 140 constructs the LP_CFG_WR_RSP message 208 and the LP_CFG_WR_RSP message is forwarded from PCIe endpoint device 104 via PCIe link 106 to SoC Host 102, where it is received by response receiver 120 in Host application layer 110. This is further depicted as message flow '9'. The process is completed in a block 616 in which response receiver 120 deciphers the LP_CFG_WR_RSP message and passes on an Acknowledgement that the low-power capability register has been successfully updated to system management unit 108.

After this point, the next time PCIe endpoint device 104 enters the PCIe-defined ASPM L1 state, instead of going into the normal L1 state the "PCIe_L1_state_3" will be used. As shown in Table 1, under the "PCIe_L1_state_3" low-power state the PCIe PHY will be consuming 5 mw power (instead of the default 30 mw for "PCIe_L1_state_1"), with 8 μs exiting latency before establishment of the L0 low-power state.

In the foregoing embodiment, the PCIe PHY is illustrated as an example of a component configured to support fine-grained low-power states. However, this is not meant to be limiting, as more blocks or components in a capable Device may be configured to employ fine-grained low-power states. Furthermore, the Host may choose to leverage a "lower-power state auto-migration" feature provided by some capable Devices. With this feature, the Host can allow a specific Device functional block (such as the PCIe PHY) to gradually migrate to lower-power states based on Table 1 example.

In addition, the teachings and principles disclosed herein may be implemented to an even more sophisticated extent, so that certain Device-level low-power behavior "sequences" can be constructed for the Host to choose. Once a supported behavior sequence is chosen, the Device will be able to walk through the exact sequence (for example, using a PMU with micro-sequencer) to better optimize the power and performance. By this means, the aforementioned configuration steps are performed even more efficiently because the LP_CFG_WR_REQ only needs to carry the pre-defined sequence select information to instruct the Device to perform a corresponding power-level sequence for one or more blocks or components on the Device.

Under the foregoing example, a trigger mechanism is used by the PMU to configure a block or component (e.g., the PHY block in the example) to effect a fine-grained low-power state in response to a subsequent power event. This requires some configuration information mapping PCIe-defined low-power states to fine-grained low-power states in the block or component. Under another approach, the translation from the PCIe-defined low-power state is performed by the PMU, with the PMU sending a power-control command or the like to the block or component instructing the block or component to enter a specific fine-grained low-power state. This approach alleviates the need to maintain mapping information in the block or component. Alternatively, a combination of these approaches may be used.

Examples of embodiments using the PMU to trigger blocks or components to enter fine-grained low power states via explicit commands sent from the PMU are shown in flowcharts 7a and 7b. In one embodiment, this approach leverages the Table 2 data structure illustrated in FIG. 5b, which shows a variation of low-power states configuration registers 144b. As illustrated, the is a separate set of low-power states configuration registers for each of a plurality of blocks or components, including a Block/Component A and a Block/Component B. An additional "Active" column 504 has been added (relative to the Table 2 configuration in FIG. 5a), wherein the values in Active column 504 are binary flags indicating which fine-grained low-power state is active for each associated PCIe-defined low power state. For example, for Block/Component A the active fine-grained low power state for PCIe-defined low-power state L1 is "PCIe_L1_state_3." As further illustrated, the active states for different blocks or components may differ.

Figure 7A:
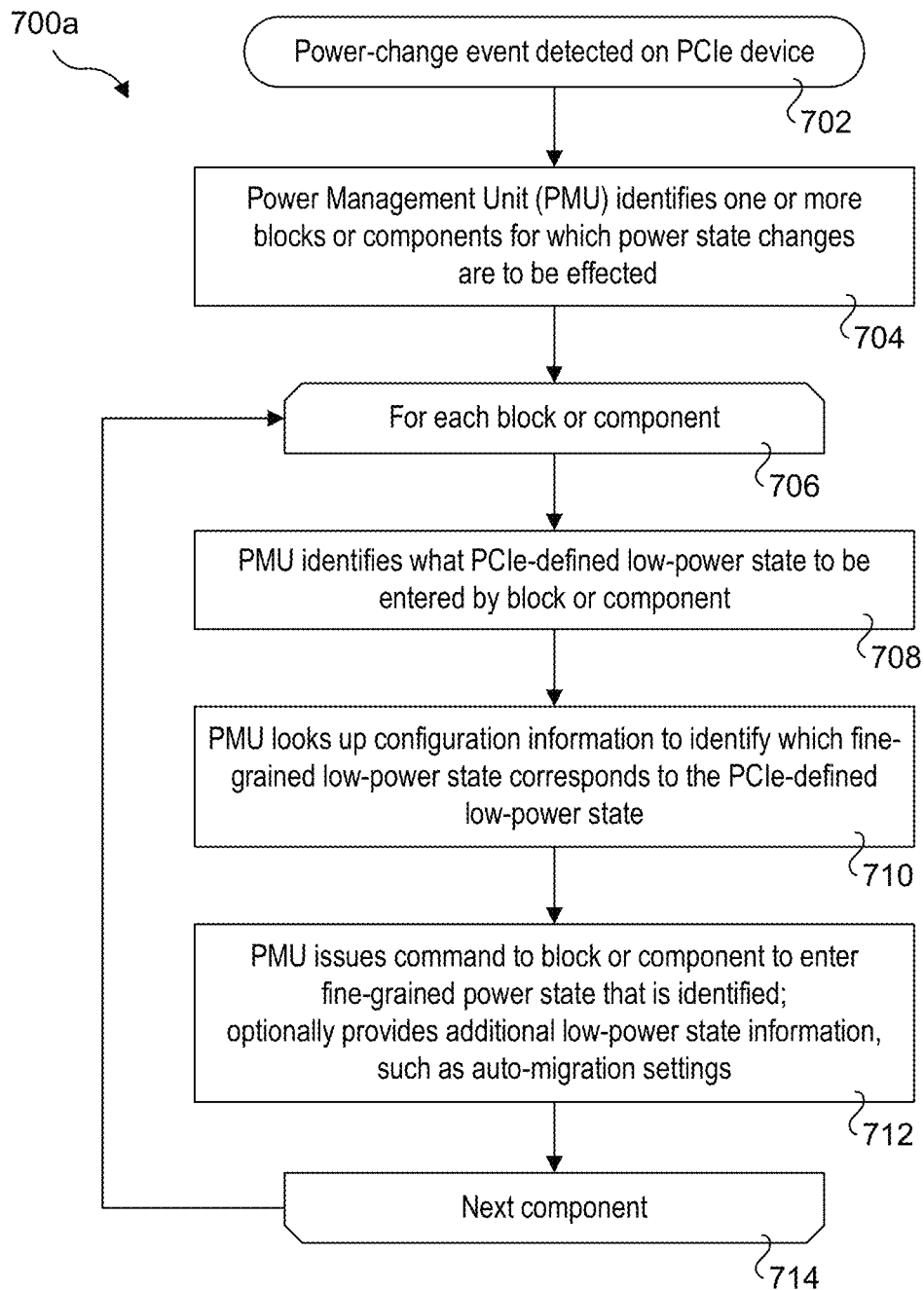
FIG. 7a is a flowchart illustrating operations associated with a power management unit effecting entry into a fine-grained low-power state for one or more components in response to detection of a power-change event on the PCIe device.

With reference to flowchart 700a of FIG. 7a, the process for effecting fine-grained low-power state changes in response to a detected power-change event proceeds as follows. In a start block 702, a power-change event is detected on the PCIe device. There are various existing means for detecting applicable power-change events on PCIe devices, with the particular means being outside the scope of this disclosure.

In response to detection of the power-change event, the PMU is notified and identifies one or more blocks or components for which power state changes are to be effected (or otherwise is provided with information identifying the same), as depicted in a block 704. As depicted by start and end loop blocks 706 and 708, the operations of blocks 708, 710 and 712 are performed for each block or component identified by the PMU in block 704.

In block 708 the PMU identifies what PCIe-defined low-power state is to be entered by the block or component. In block 710, the PMU looks up the configuration information (e.g., in Table 2 or via a combination of Tables 1 and 2) to identify which fine-grained low-power state corresponds to the PCIe-defined low-power state. The PMU then issues a command to the block or component to enter the fine-grained low-power state that is identified. Optionally, the PMU may provide additional low-power state information, such as auto-migration settings to be implemented for a power-level change sequence.

Figure 7B:
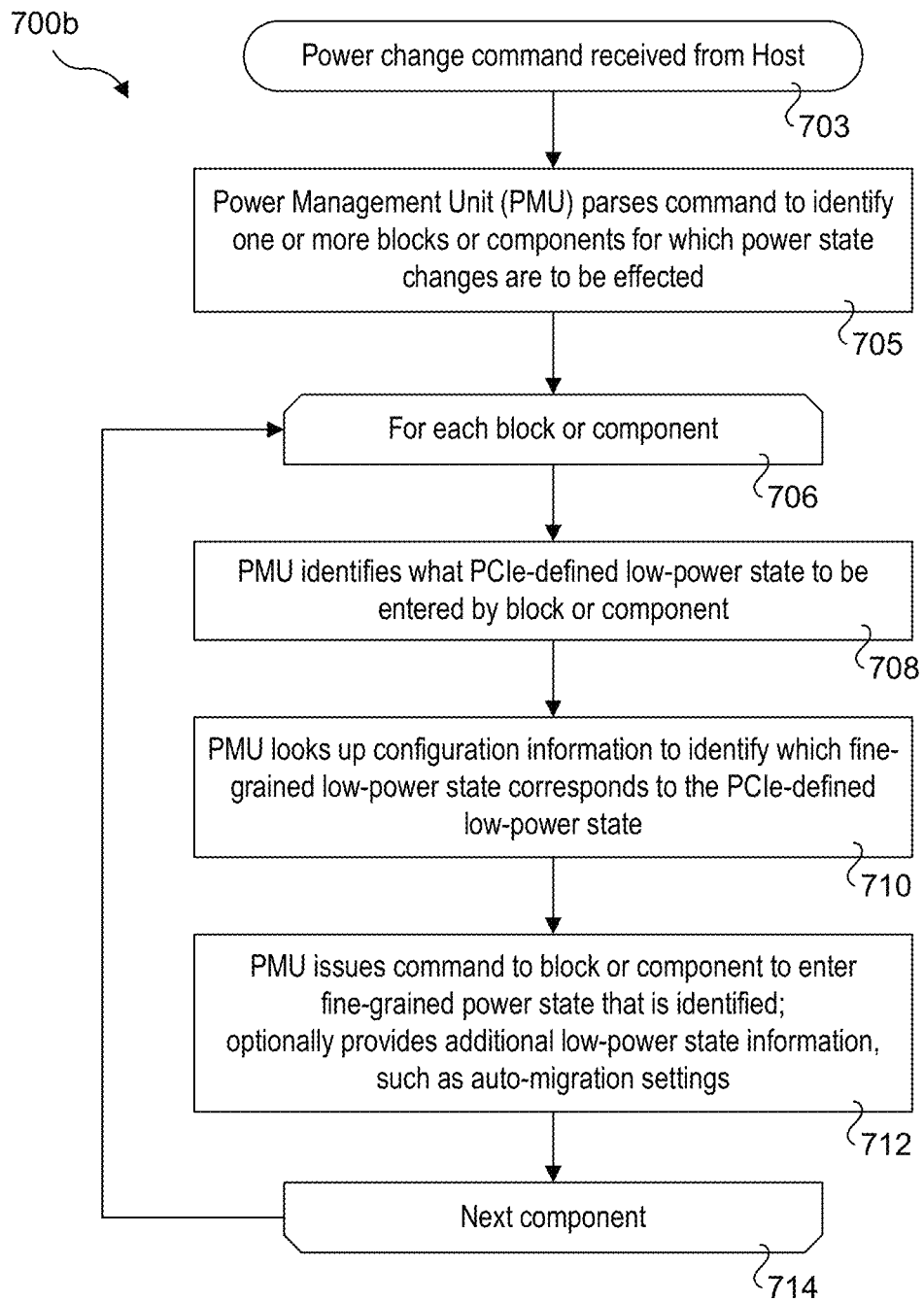
FIG. 7b is a flowchart illustrating operations associated with a power management unit effecting entry into a fine-grained low-power state for one or more components in response a power-change command received from the host.

In addition to detecting power events, a Host may provide commands to a PCIe device to effect power-level changes to one of more blocks or components on the PCIe device. An example of this scheme, according to one embodiment, is illustrated by the operations in the flowchart 700b or FIG. 7b. This process begins in a start block 703 in which a power change command is received from the Host by the PCIe device. As with other communication, the power change command may be sent over the PCIe link and received by a receiver or the like, which forward the power change command to the PMU. In a block 705 the PMU parsed the command to identify one or more blocks or components for which power state changes are to be effected. The logic then proceeds to perform operations depicted in blocks 706, 708, 710, 712, and 714 for each block or component that is identified in a similar manner to that described above for flowchart 700a.

Under one approach, the Host sends conventional PCIe-defined low-power state control commands to the PCIe device, and the PMU performs the translation to identify the corresponding fine-grained low-power state to enter for each component based on the PCIe-define low-power state in the control command. Under another approach, the Host may specifically identify the fine-grained low-power state to be entered in the power change command. In this case, the operations of blocks 708 and 710 may be skipped since the fine-grained low-power state to be entered is already identified.

Vendor Defined Message Exchange to Effect Fine-Grained Low-Power State Configuration and Mode Selection As discussed above, various types of handshake and/or exploration mechanisms between the Host and PCIe device may be implemented to convey related control/status information related to configuration and selection of fine-grained low-power states. Under one approach, a Vendor Defined Message exchange scheme is implemented. The PCIe specification enable vendors to add enhancements and features through use of Vendor Defined Messages. In PCIe 4.0, these are referred to as "Vendor_Defined Messages," and defined in section 2.2.8.6. The Vendor Defined Messages allow expansion of PCI Express messaging capabilities, either as a general extension to the PCI Express Specification or a vendor-specific extension.

FIG. 8 shows a table specifying aspects of Vendor Defined Messages, which use the header format shown in FIG. 9a. As defined in PCIe 4.0 section 2.2.8.6, The Requester ID is implementation specific. It is strongly recommended that the Requester ID field contain the value associated with the Requester.

If the Route by ID routing is used, bytes 8 and 9 form a 16-bit field for the destination ID otherwise these bytes are Reserved.

Bytes 10 and 11 form a 16-bit field for the Vendor ID, as defined by PCI-SIG®, of the vendor defining the Message.

Bytes 12 through 15 are available for vendor definition.

As an option, PCI-SIG-Defined VDMs may be used. As defined in PCIe 4.0 section 2.2.8.6.1, PCI-SIG-Defined VDMs are Vendor-Defined Type 1 Messages that use the PCI-SIG® Vendor ID (0001h). As a Vendor-Defined Type 1 Message, each is silently discarded by a Completer if the Completer does not implement it.

Beyond the rules for other Vendor-Defined Type 1 Messages, the following rules apply to the formation of the PCI-SIG-Defined VDMs:

PCI-SIG-Defined VDMs use the Header format shown in FIG. 9b.

The Requester ID field must contain the value associated with the Requester.

The Message Code must be 01111111b.

The Vendor ID must be 0001h, which is assigned to the PCI-SIG.

The Subtype field distinguishes the specific PCI-SIG-Defined VDMs.

Figure 2B:
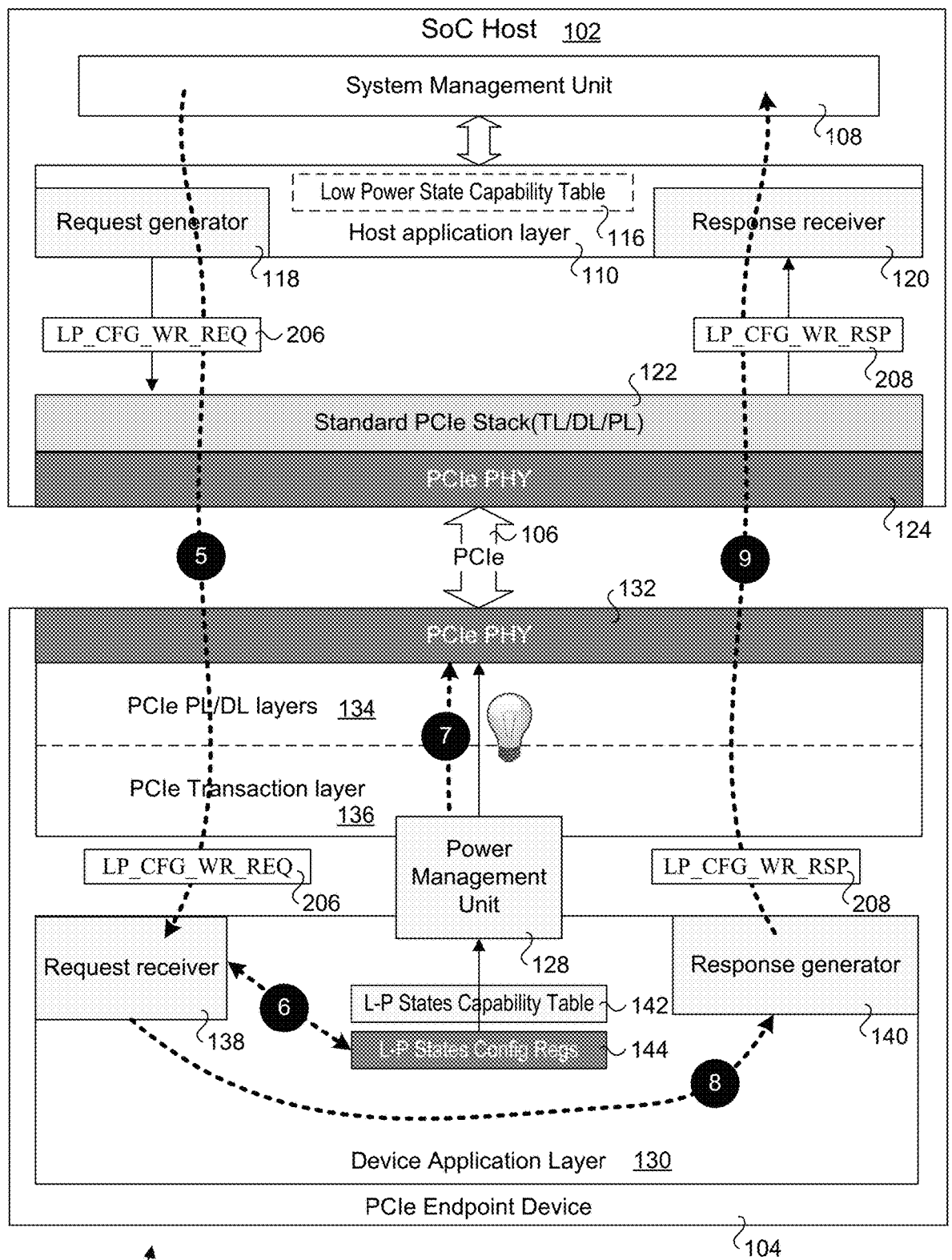
FIG. 2b is a system architecture message flow diagram illustrating further details of the system architecture of FIG. 1 along with message flows between components for effecting a selected fine-grained low-power state and operating mode for a PCIe endpoint device, according to one embodiment.
Figure 10A:
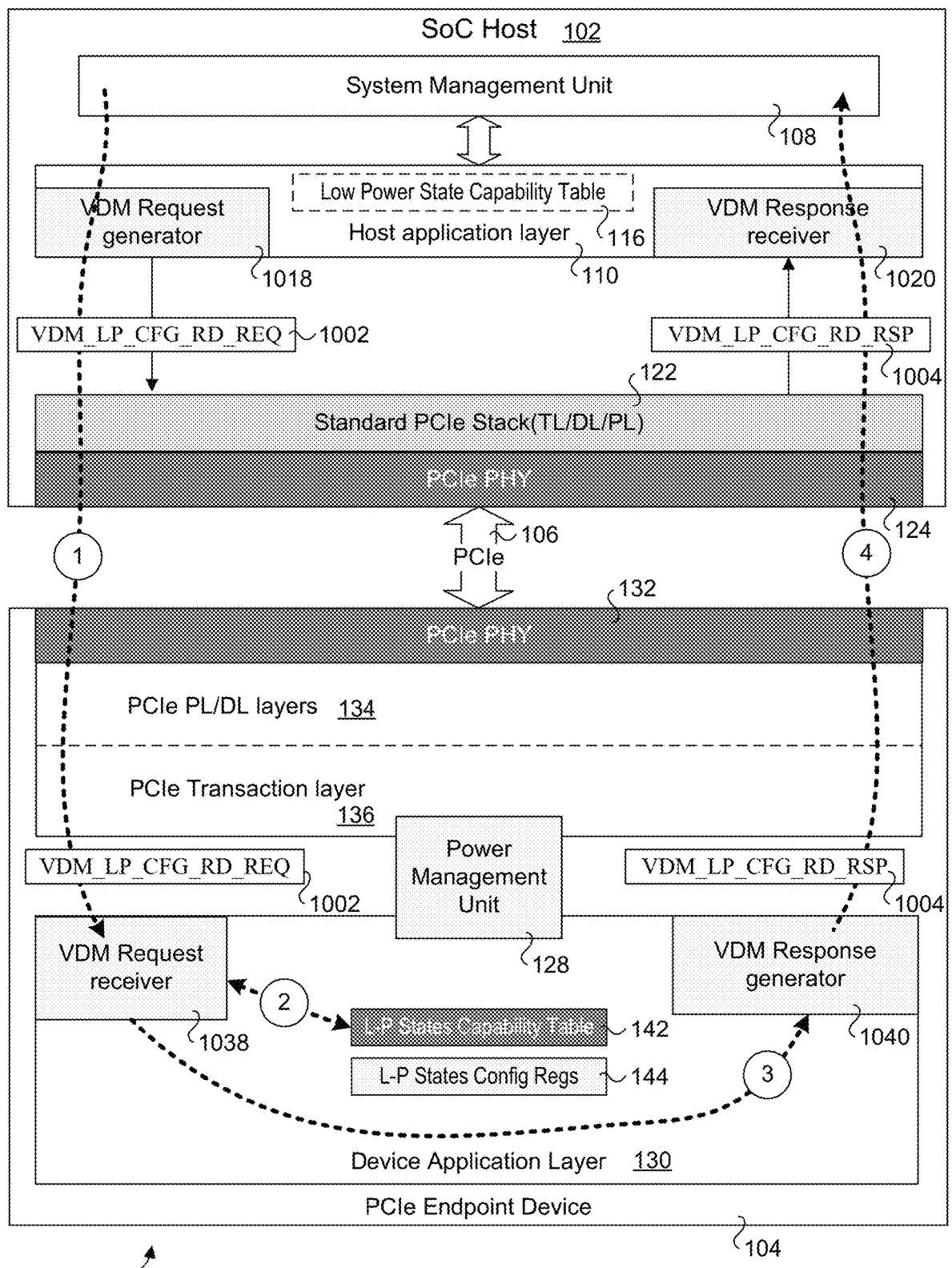
FIG. 10a is a system architecture and message flow diagram illustrating an implementation of the message flow in FIG. 2a that employs Vendor Defined Messages (VDMs), according to one embodiment.
Figure 10B:
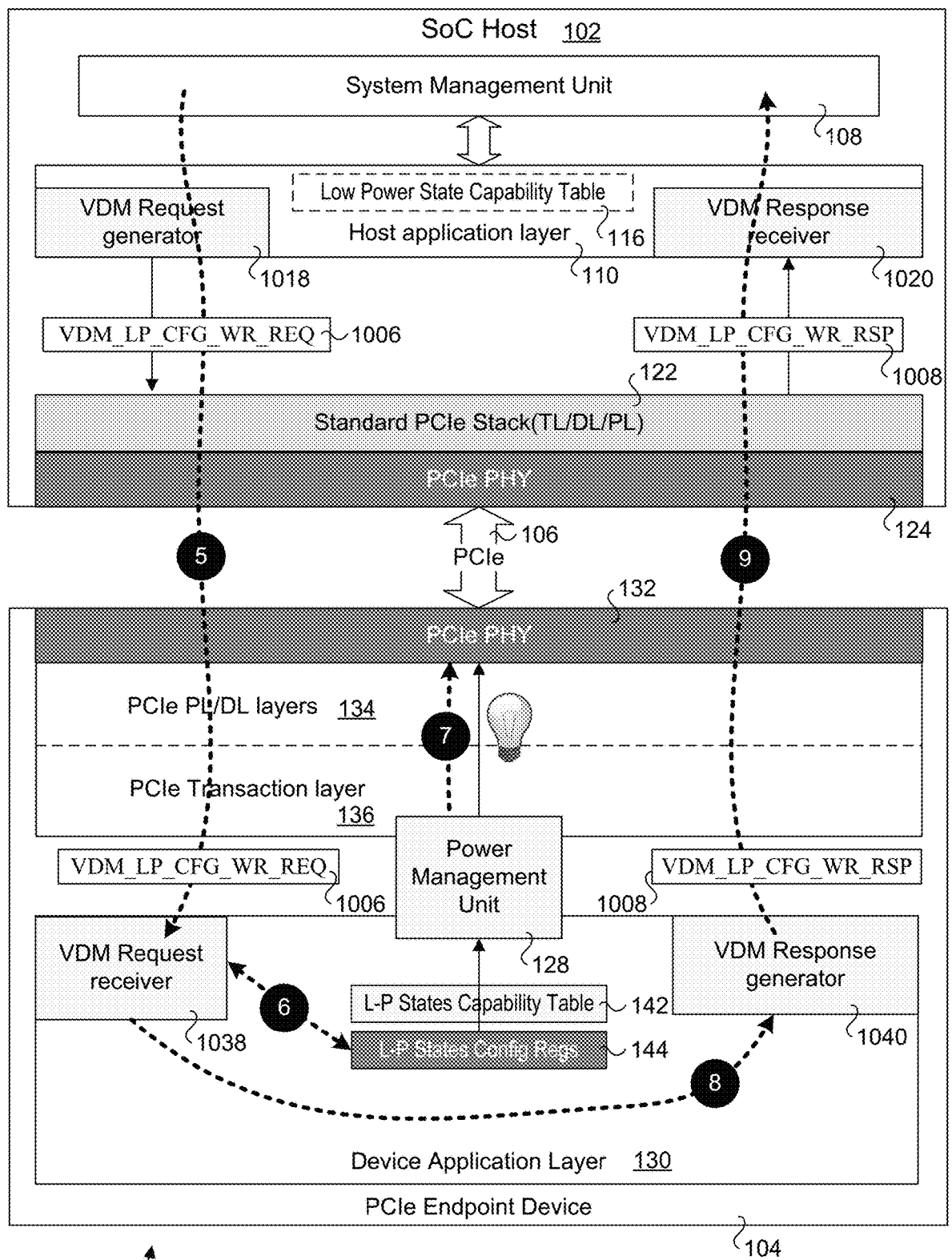
FIG. 10b is a system architecture and message flow diagram illustrating an implementation of the message flow in FIG. 2b that employs VDMs, according to one embodiment.

FIGS. 10a and 10b respectively show diagrams 1000a and 1000b that are augmented versions of the architecture and message flow diagrams 200a and 200b of FIGS. 2a and 2b configured to employ VDMs. One of the differences between the diagrams in FIGS. 2a, 2b and 10a, 10b is that the request and response generators and receivers are VDM request and response generators and receivers. These include VDM request generator 1018 and VDM response receiver 1020 in host application layer 110 and VDM request receiver 1038 and VDM response generator 1040 in device application layer 130.

Figure 6:
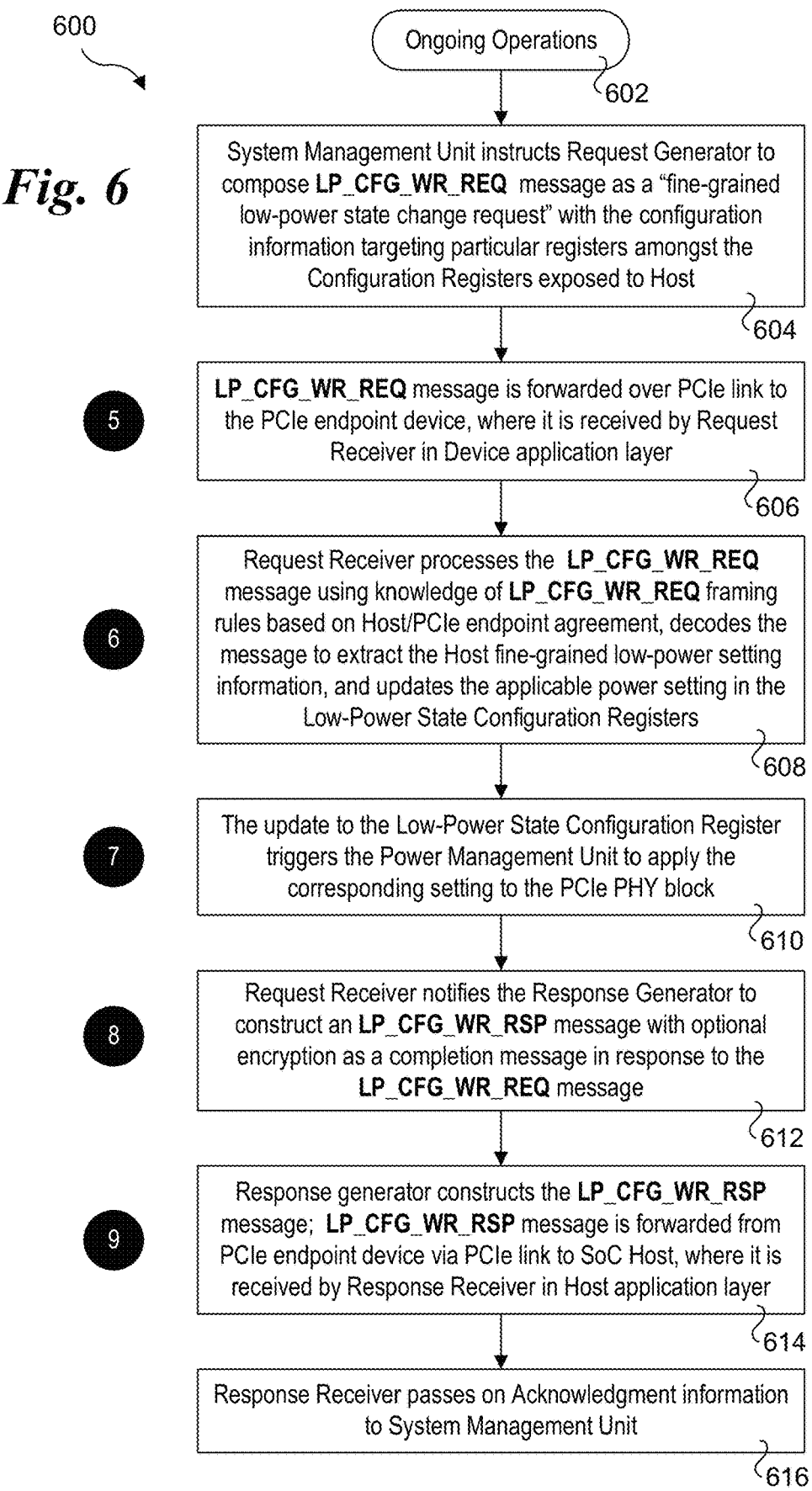
FIG. 6 is a flowchart illustrating operations performed by components in the message flow diagram of FIG. 2b for effecting a selected fine-grained low-power state and operating mode for the PCIe endpoint device, according to one embodiment.

Generally, when VDM is used the message flows and operations discussed above with reference to FIGS. 2a and 2b and depicted in flowcharts 300 and 600 of FIGS. 3 and 6 are substantially similar, except the TLP and/or messages that are sent over PCIe link 106 are VDMs. For example, as depicted in FIG. 10a, under message flow '1' a VDM_LP_CFG_RD_REQ message 1002 is sent from VDM request generator 1018 to VDM request receiver 1038 over PCIe link 106. Under message flow '4', a VDM_LP_CFG_RD_RSP message 1004 is sent from VDM response generator 1040 to VDM response receiver 1020 over PCIe link 106. As depicted in FIG. 10b, under message flow '5' a VDM_LP_CFG_WR_REQ message 1006 is sent from VDM request generator 1018 to VDM request receiver 1038 over PCIe link 106. Under message flow '9', a VDM_LP_CFG_WR_RSP message 1008 is sent from VDM response generator 1040 to VDM response receiver 1020 over PCIe link 106.

Figure 11:
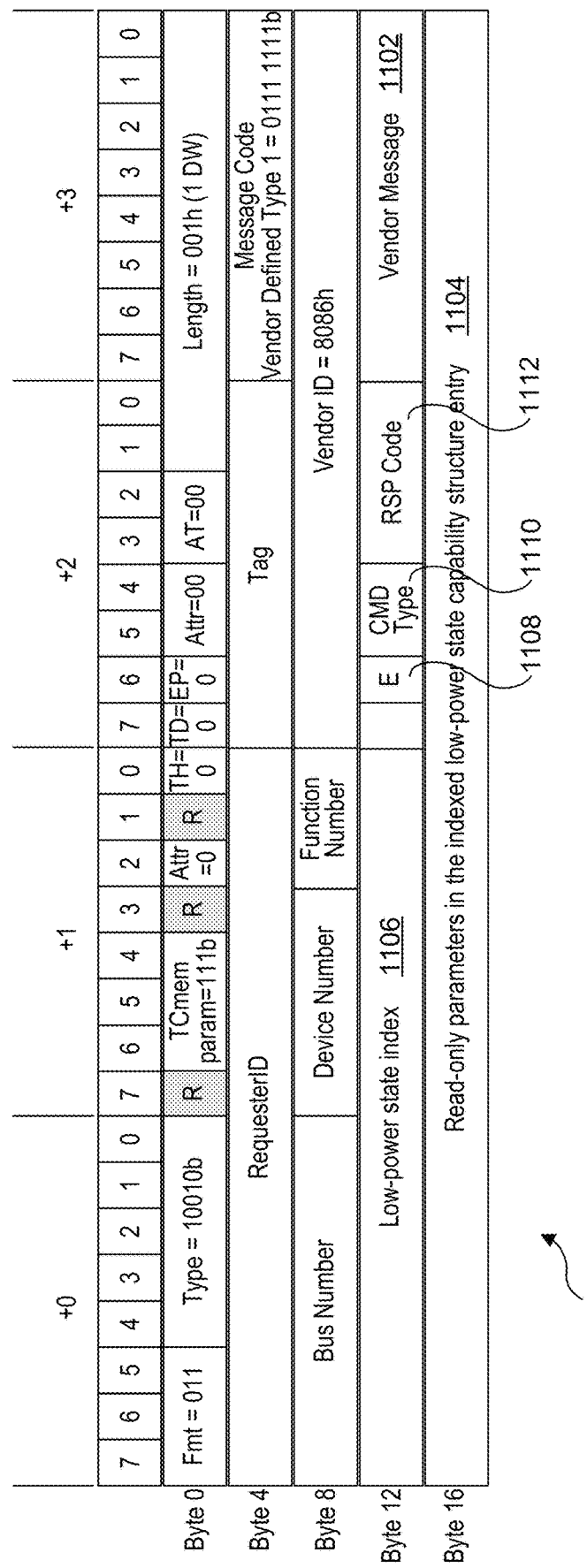
FIG. 11 is a diagram illustrating an example of a VDM frame definition, according to one embodiment.

FIG. 11 shows an example of a VDM frame definition 1100, according to one embodiment. VDM frame definition 100 generally follows the VDM header format of FIG. 7, while further depicting selected fields populated with vendor-specific or function-specific data. The "Vendor Message" byte field 1102 defines the detail type of command Request or Response associated to the VDM. Depending on whether a VDM is to include and associated data payload, the last Double-word (field 1004, Bytes 16-19) may or may not be associated to the VDM, hence the "Length" field value may vary between 1 (1DW data payload) and 0 (reserved value as no payload). For example, VDM_LP_CFG_RD_RSP message 1004 will include a payload comprising read-only parameters in the indexed low-power state capability structure entry.

Other exemplary fields shown in VDM frame definition 1100 include low-power state index field 1106, a low-power auto-migration enable flag 1108, a command (CMD) type field 1110, and a Response (RSP) code field 1112. The fields illustrated in VDM frame definition 1100 are exemplary and non-limiting; additional VDM frame definitions corresponding to different VDM messages may be defined in a similar manner.

Vendor-Specific Extended Capability (VSEC) to Effect Fine-Grained Low-Power State Configuration and Mode Selection Under another approach, The PCI Express Vendor-Specific Extended Capability (VSEC) is used to effect fine-grained low-power state configuration and mode selection. The PCI Express VSEC is an optional Extended Capability that is permitted to be implemented by any PCI Express Function or RCRB (Root Complex Register Block). This allows PCI Express component vendors to use the Extended Capability mechanism to expose vendor-specific registers.

Details of the VSEC structure and shown in FIGS. 12a, 12b, and 13. FIG. 12a details allocation of register fields in a VSEC structure 1200, as defined by section 7.9.5 of the PCIe 4.0 Specification. VSEC structure 1200 includes a PCI Express extended capability header 1202, a vendor-specific header 1204, and vendor-specific registers 1206.

As shown in FIG. 12b, PCI Express extended capability header 1202 includes a 16-bit (15:0) PCI Express Extended Capability ID field, a 4-bit (19:16) Capability Version field, and a 12-bit (31:20) Next Capability Offset field. The PCI Express Extended Capability ID field is a PCI-SIG defined ID number that indicates the nature and format of the Extended Capability, which has a value of 000Bh for a vendor-specific extended capability. The Capability Version field is a PCI-SIG defined version number that indicates the version of the Capability structure present. The Next Capability Offset field contains the offset to the next PCI Express Capability structure or 000h if no other items exist in the linked list of Capabilities. For Extended Capabilities implemented in Configuration Space, this offset is relative to the beginning of PCI-compatible Configuration Space and thus must always be either 000h (for terminating list of Capabilities) or greater than 0FFh.

The format of vendor-specific header 1204 is shown in FIG. 13. As illustrated, the vendor-specific header format includes a 16-bit (15:0) VSEC ID field, a 4-bit (19:16) VSEC Rev field, and a 12-bit (31:20) VSEC Length field. The VSEC ID field includes a vendor-define ID number that indicates the nature and format of the VSEC structure. The VSEC Rev field contains a vendor-defined version number that indicates the version of the VSEC structure, while the VSEC Length field indicates the number of bytes in the entire VSEC structure, including the PCI Express Extended Capability header, the vendor-specific header, and the vendor-specific registers. Vendor-specific software must qualify the associated Vendor ID of the PCI Express Function or RCRB before attempting to interpret the values in the VSEC ID or VSEC Rev fields.

Figure 14A:
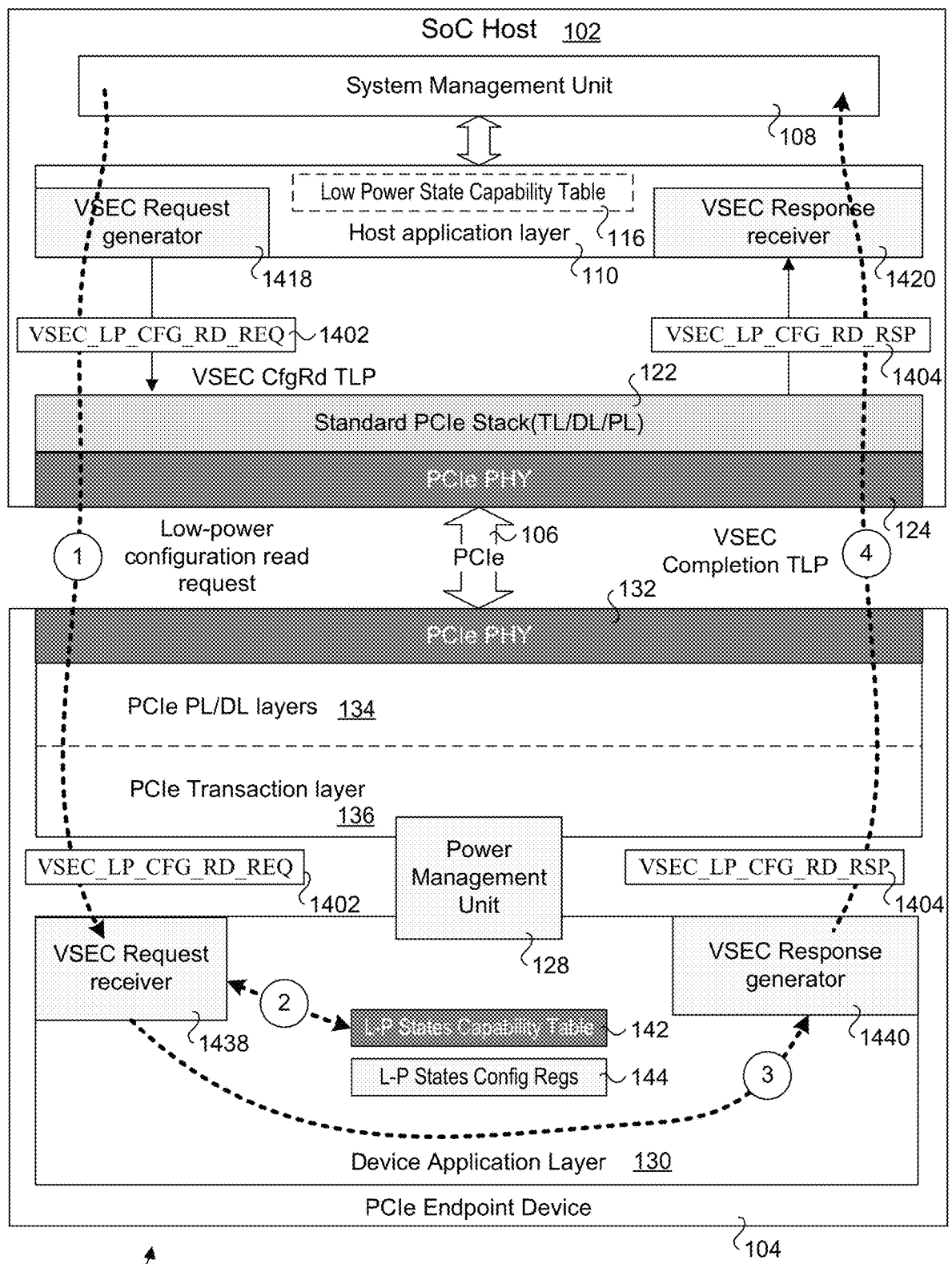
FIG. 14a is a system architecture and message flow diagram illustrating an implementation of the message flow in FIG. 2a that employs VSEC TLPs, according to one embodiment.
Figure 14B:
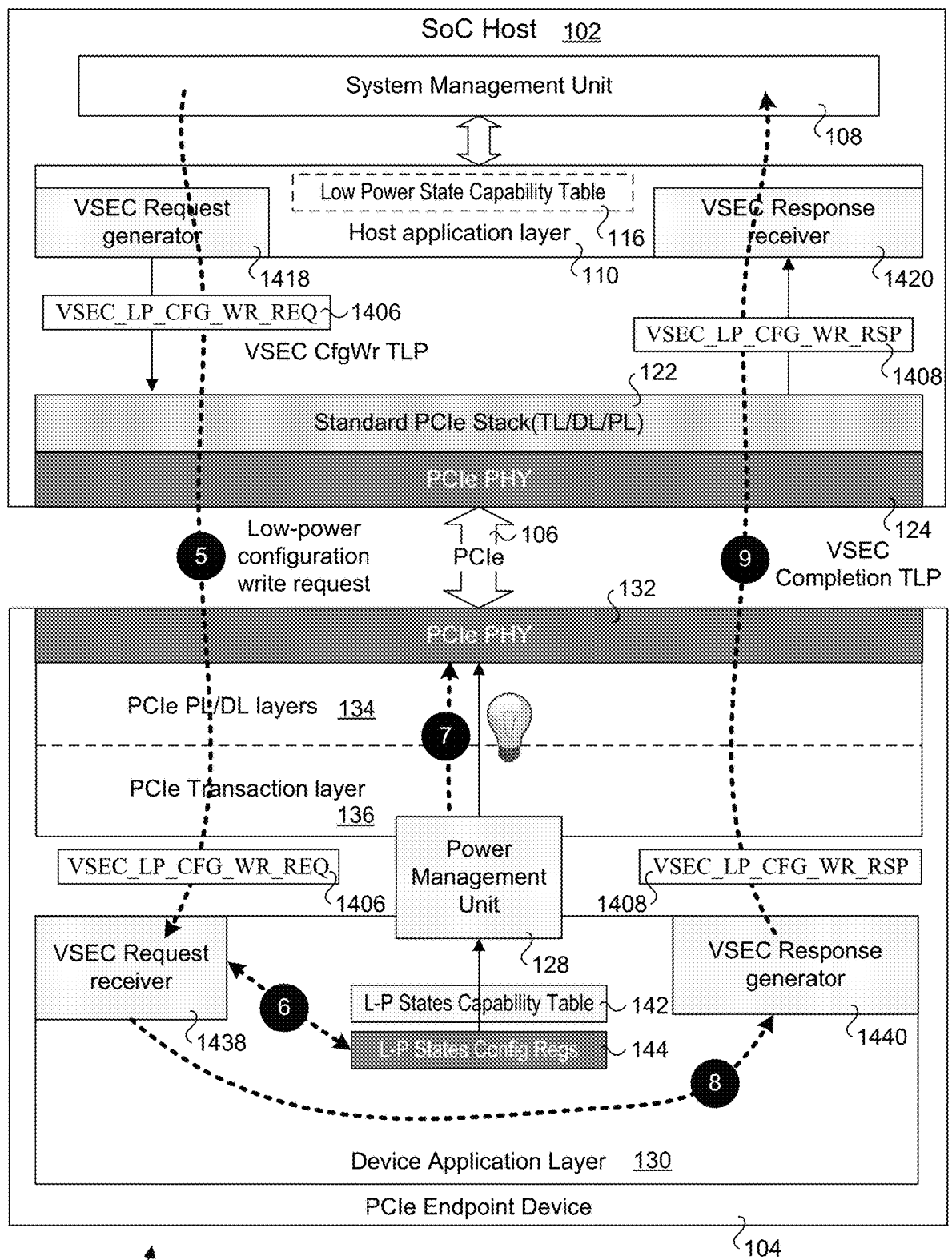
FIG. 14b is a system architecture and message flow diagram illustrating an implementation of the message flow in FIG. 2b that employs VSEC TLPs, according to one embodiment.

FIGS. 14a and 14b respectively show diagrams 1400a and 1400b that are augmented versions of the architecture and message flow diagrams 200a and 200b of FIGS. 2a and 2b configured to employ VSEC TLPs. The message flow patterns of FIGS. 14a and 14b are similar to that illustrated above in FIGS. 2a and 2b, wherein components with common reference numbers in FIGS. 2a, 2b, 14a, and 14b are configured to perform similar operations. Accordingly, the following will focus on differences between the VSEC approaches in FIGS. 14a and 14b and aspects illustrated in FIGS. 2a and 2b discussed above.

Under the embodiments of FIGS. 14a and 14b the request and response generators and receivers are VSEC request and response generators and receivers. These include VSEC request generator 1418 and VSEC response receiver 1420 in host application layer 110 and VSEC request receiver 1438 and VSEC response generator 1440 in device application layer 130.

Generally, when VSEC TLPs are used the message flows and operations discussed above with reference to FIGS. 2a and 2b and depicted in flowcharts 300 and 600 of FIGS. 3 and 6 are substantially similar, except the TLP and/or messages that are sent over PCIe link 106 are VSEC TLPs. For example, as depicted in FIG. 14a, under message flow '1' a VSEC_LP_CFG_RD_REQ TLP 1002 is sent from VSEC request generator 1418 to VSEC request receiver

1438 over PCIe link 106. Under message flow '4', a VSEC_LP_CFG_RD_RSP TLP 1404 is sent from VSEC response generator 1440 to VSEC response receiver 1420 over PCIe link 106. As depicted in FIG. 14b, under message flow '5' a VSEC_LP_CFG_WR_REQ TLP 1406 is sent from VSEC request generator 1418 to VSEC request receiver 1438 over PCIe link 106. Under message flow '9', a VSEC_LP_CFG_WR_RSP_TLP 1408 is sent from VSEC response generator 1440 to VSEC response receiver 1420 over PCIe link 106.

Figure 15A:
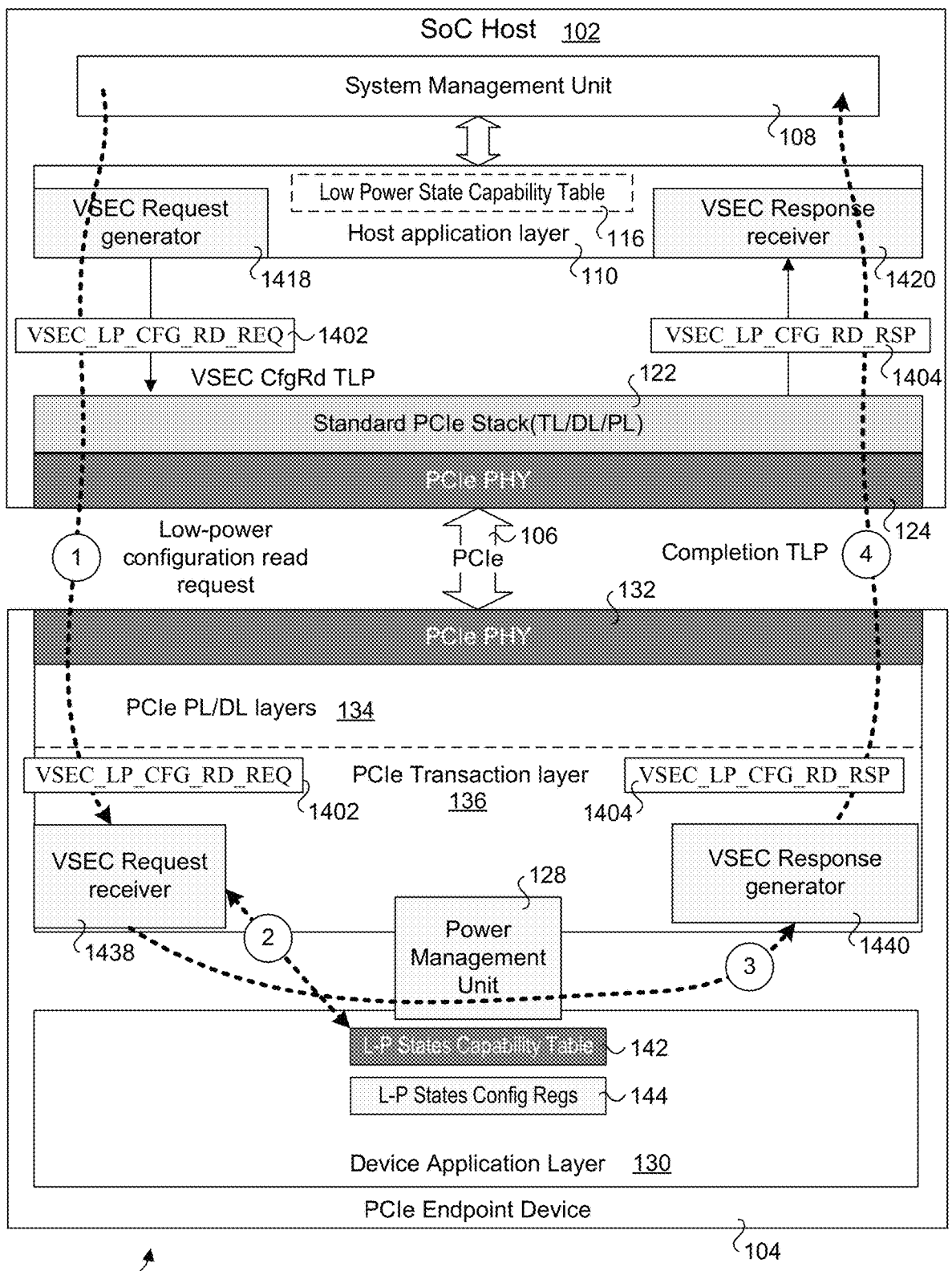
FIG. 15a is a system architecture and message flow diagram illustrating an alternative implementation of the scheme in FIG. 14a under which the VSEC request receiver and VSEC response generator is implemented in the PCIe transaction layer, according to one embodiment.
Figure 15B:
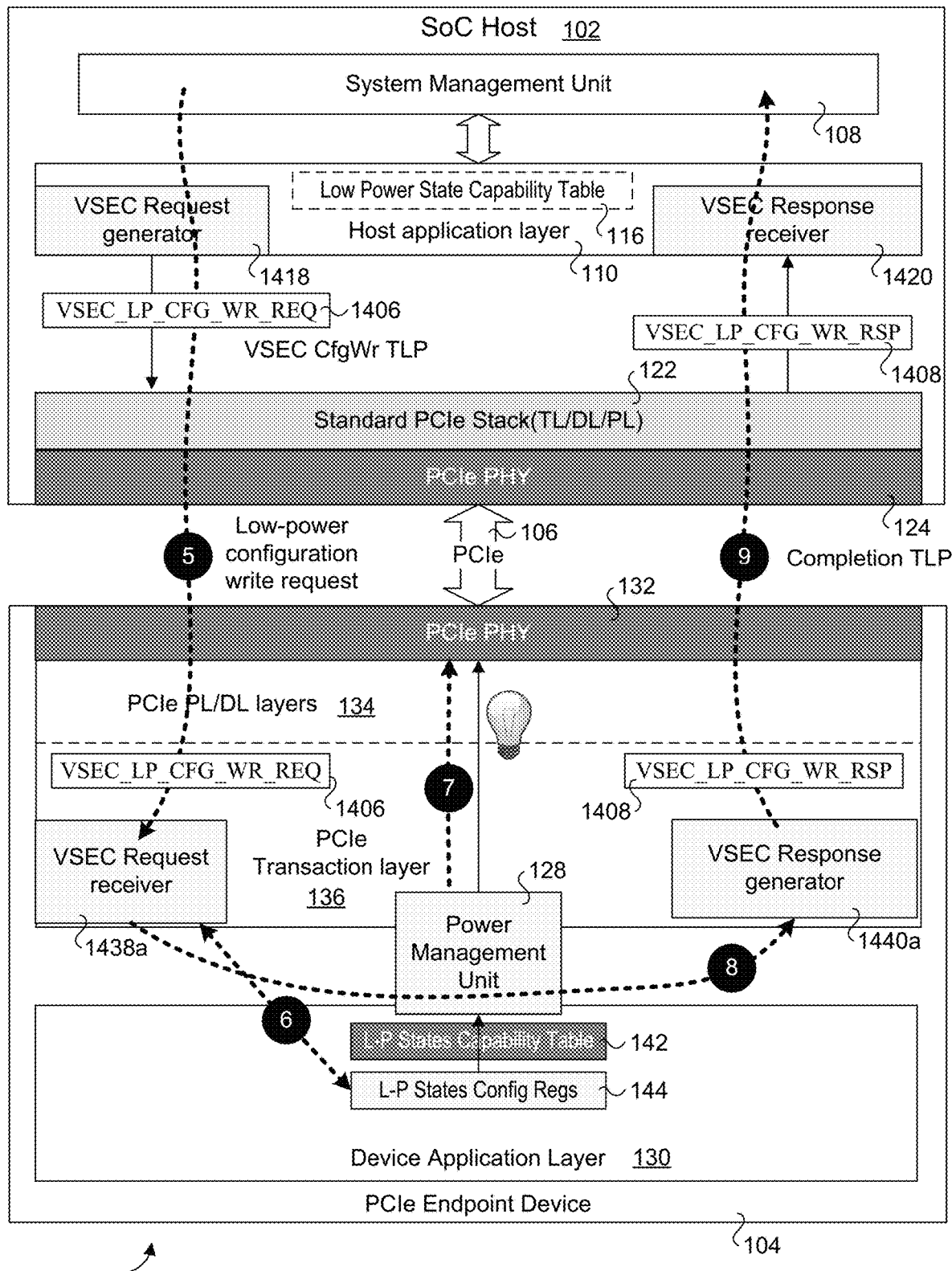
FIG. 15b is a system architecture and message flow diagram illustrating an alternative implementation of the scheme in FIG. 14b under which the VSEC request receiver and VSEC response generator is implemented in the PCIe transaction layer, according to one embodiment.

Under some embodiments, VSEC components are implemented in the PCIe transaction layer on the PCIe endpoint device rather than the Device application layer. Examples of this are illustrated in diagrams 1500a and 1500b of FIGS. 15a and 15b. The message flows for the VSEC embodiments illustrated in FIGS. 15a and 15b are substantially similar to those shown in FIGS. 14a and 14b, except the VSEC request receiver (now labeled 1438a) and VSEC response generator (now labeled 1440a) are implemented in PCIe transaction layer 136 rather than device application layer 130. The remainder of the flow and operations are similar under both VSEC configurations.

Figure 16:
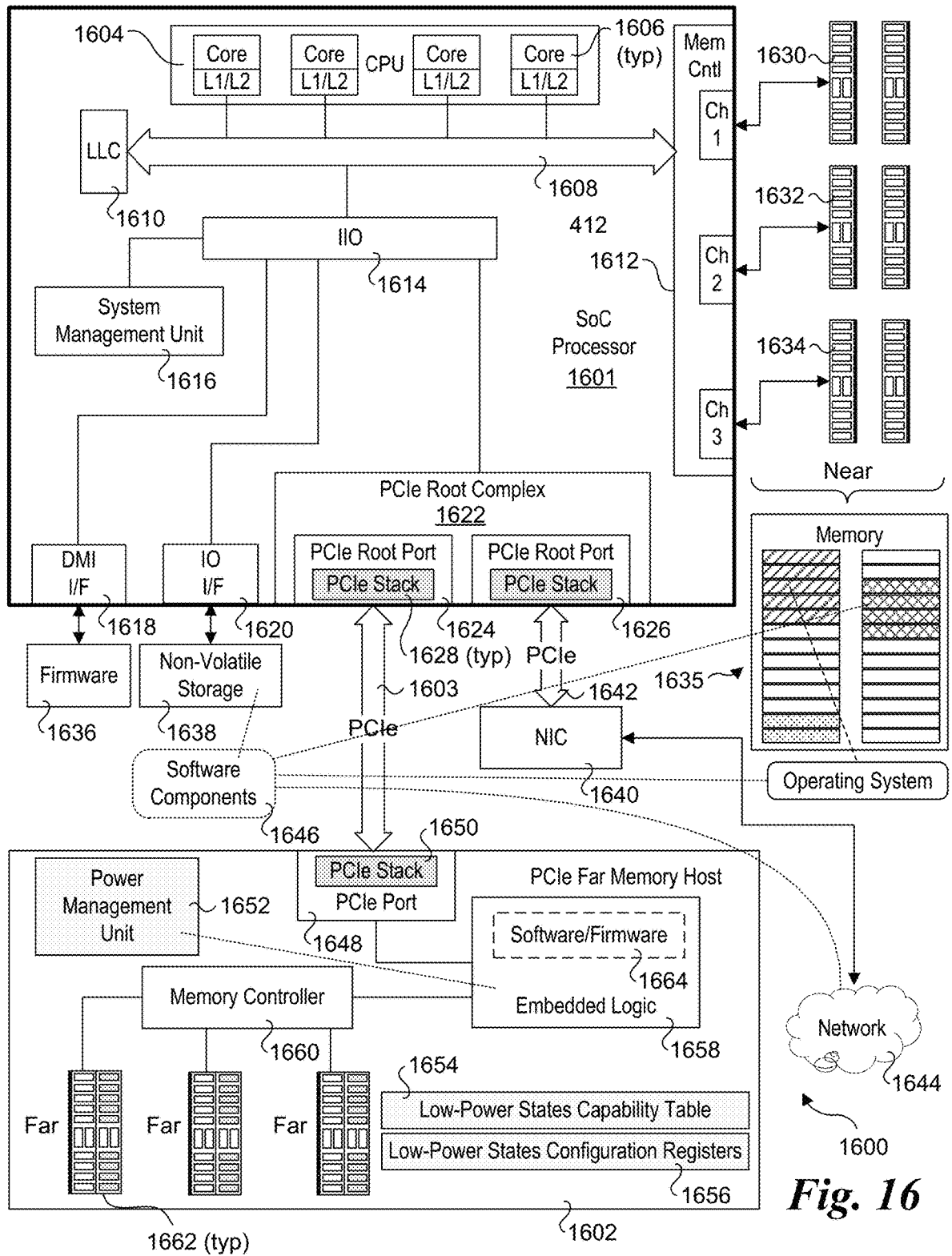
FIG. 16 is a diagram of a system configured to implement a two-level memory (2LM) scheme, and further configured to implement host-controlled hints prior to low-power entry of blocks or components on a PCIe device accordance with aspects of the embodiments disclosed herein.

FIG. 16 shows a system 1600 configured to implement aspects of the embodiments herein. System 1600 includes a SoC processor 1601 coupled to a PCIe far memory host 1602 via a PCIe link 1603. SoC processor 1601 includes a central processing unit (CPU) 1604 including a plurality of processor cores 1606, each with a respective L1 and L2 cache. Each of the processor cores 1606 is connected to an interconnect 1608 to which a last level cache (LLC) 1610, a memory controller 1612, and an integrated input-output (ITO) block 1614 is coupled.

IIO block 1614 provides an interface between various components and interconnect 1608. These components include a system management unit 1616, a DMI interface (I/F) 1618, an IO interface 1620, and a PCIe root complex 1622. PCIe root complex 1622 has a plurality of PCIe root ports, including PCIe root ports 1624 and 1626, each having a respective PCIe stack 1628.

Memory controller 1612 generally will include one or more memory channels coupled to random access memory devices. In the example illustrated in FIG. 16, memory controller 1612 includes three memory channels Ch 1, Ch 2, and Ch 3, each coupled to one or more DRAM DIMMs (dual in-line memory modules), as depicted by DRAM DIMMs 1630, 1632, and 1634. The DRAM DIMMs collectively comprise "near" system memory 1635.

DMI interface 1618 is connected to a firmware storage device 1638 in which firmware is stored, such as but not limited to a Flash memory device. Generally, the firmware is used to boot the system and support various run-time operations at the firmware level. JO interface 1620 is connected to a non-volatile storage device 1638, such as a solid state disk (SSD), although any time of non-volatile storage device may be used, including a magnetic disk drive, optical disk drive, etc.

PCIe root port 1626 is connected to a network interface controller (NIC) 1640 via a PCIe link 1642. NIC 1640, in turn, is configured to be connected to a network 1644 when system 1600 is operating. For example, in some embodiments, system 1600 is a server blade or server module configured to be implemented in a chassis or the like in a rack in a data center.

System 1600 further includes software components 1646. Generally, the software components may include an operating system and application software. The operating system will generally include various device drivers, including device drivers that may be added to an operating system (if not provided with the operating system when deployed). Various portions of the software components may reside on or otherwise be accessed from non-volatile storage 1646 or network 1644. For example, in some embodiments the software components will be stored on an SSD or the like, and access from the SSD and loaded into system memory 1635 during run-time operations. In other embodiments, various software components may be accessed over network 1644, and subsequently loaded into system memory 1635.

PCIe far memory host 1602 is a PCIe endpoint device configured to implement one or more embodiments of the fine-grained low-power configuration and mode selection schemes described herein. It includes a PCIe port 1648 implementing a PCIe stack 1650. Generally, PCIe port 1648 may be configured in a similar manner to PCIe port 126 of FIG. 1 discussed above. PCIe far memory host 1602 also includes a power management unit 1652, a low-power states capability table 1654, low-power states configuration registers 1656, embedded logic 1658 coupled to PCIe port 1648 and a memory controller 1660. Memory controller 1660 is coupled to a plurality of Non-Volatile DIMMs (NVDIMMs) 1662, which in one embodiment comprise 3D XPoint® NVDIMMs from Intel® Corporation.

Embedded logic 1658 is illustrative of any type of embedded logic using to implement the functionality of a PCIe endpoint device described herein. This includes hardware-based logic, software-based logic, or a combination of the two. For example, some of all of the functionality may be implemented using hardware-based logic, such as programmed logic components including but not limited to an FPGA (Field Programmable Gate Array) or an ASIC (Application Specific Integrated Circuit). Embedded logic 1658 may also be implemented by software and/or firmware executed on an embedded processor or one or more processing elements, as depicted by an optional software/firmware block 1664. Various types of processors may be used for such an embedded processor, including general-purpose processors, processor engines, microcontrollers, etc.

System 1600 is configured to support a two-level memory (2LM) scheme under which a first level of "near" memory is accessed by memory controller 1612 on SoC processor 1602, while a second level of "far" memory is accessed over PCIe link 1603. The 2LM scheme may implement aspects of the embodiments disclosed herein to implement one or more fine-grained low-power states for PCIe far memory host 1602. For example, under different scenarios it may be advantageous to use one or more of the fine-grained low-power states during ongoing operations.

The teachings and principles disclosed herein provide several advantageous over current approaches. They provide various options for a power-saving-capable system to introduce fine-grained lower-power states for PCIe endpoint devices, so that a system power architecture can be more optimized and to better manage exit latencies. The schemes fortify 2LM-related and other potential computing systems by hiding/encrypting critical power-mode information and preventing it from being exposed to potential competitors or malicious actors. Embodiments may be implemented though use of a host application layer and device application layer while otherwise using standard PCIe components and standard PCIe stacks. The embodiments also provide a generic mechanism to advertise and/or exchange dynamic system low-power operating modes and functions from both a host and device endpoint point of view, depending on system architecture needs, during run-time operations.

In addition, the disclosed approaches leverage a PCIe device's advanced low-power features beyond the limited coarse-grained low-power options defined by PCIe specification. The approach enables fully hardware autonomous (Operating System/Software driver agnostic) and/or more system optimization on power and efficiency by initializing orchestrated low-power transition based on system knowledge obtained and/or owned by Host. Under additional aspects, the approach fortifies 2LM-related and other potential computing systems by utilizing vendor specific critical power-mode hint information and preventing it from being exposed to potential competitors or malicious actors. Moreover, the techniques and mechanism are fully PCIe compliant. They are built on top of existing PCIe-defined power state transition mechanisms and devices uses existing PCIe-defined methods to trigger low-power state transition.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other. Additionally, "communicatively coupled" means that two or more elements that may or may not be in direct contact with each other, are enabled to communicate with each other. For example, if component A is connected to component B, which in turn is connected to component C, component A may be communicatively coupled to component C using component B as an intermediary component.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As discussed above, various aspects of the embodiments herein may be facilitated by corresponding software and/or firmware components and applications, such as software and/or firmware executed by an embedded processor or the like. Thus, embodiments of this invention may be used as or to support a software program, software modules, firmware, and/or distributed software executed upon some form of processor, processing core or embedded logic a virtual machine running on a processor or core or otherwise implemented or realized upon or within a non-transitory computer-readable or machine-readable storage medium. A non-transitory computer-readable or machine-readable storage medium includes any mechanism for storing or transmitting information in a form readable by a machine (e.g., a computer). For example, a non-transitory computer-readable or machine-readable storage medium includes any mechanism that provides (i.e., stores and/or transmits) information in a form accessible by a computer or computing machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A non-transitory computer-readable or machine-readable storage medium may also include a storage or database from which content can be downloaded. The non-transitory computer-readable or machine-readable storage medium may also include a device or product having content stored thereon at a time of sale or delivery. Thus, delivering a device with stored content, or offering content for download over a communication medium may be understood as providing an article of manufacture comprising a non-transitory computer-readable or machine-readable storage medium with such content described herein.

The operations and functions performed by various components described herein may be implemented by software running on a processing element, via embedded hardware or the like, or any combination of hardware and software. Such components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration information, etc.) may be provided via an article of manufacture including non-transitory computer-readable or machine-readable storage medium, which provides content that represents instructions that can be executed. The content may result in a computer performing various functions/operations described herein.

As used herein, a list of items joined by the term "at least one of" can mean any combination of the listed terms. For example, the phrase "at least one of A, B or C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method for effecting power changes in a computer system including a host coupled to Peripheral Component Interconnect Express (PCIe) device via a PCIe link, comprising:
storing, on the PCIe device, one or more data structures containing low-power state capability information mapping one or more fine-grained low-power states for each of at least one of an L0s, L1, L1.1, and L1.2 PCIe-defined low-power state;
configuring, through use of the low-power state capability information, a block or component on the PCIe device to enter a fine-grained low-power state instead of an associated PCIe-defined low-power state mapped to the fine-grained low-power state when the PCIe device detects a power-change event or receives a command to enter the associated PCIe-defined low-power state.

2. The method of claim 1, further comprising:
generating, at the host, a low-power configuration write request defining a fine-grained low-power state to be used by the PCIe device;
sending the low-power configuration write request over the PCIe link to the PCIe device;
extracting, at the PCIe device, information identifying the fine-grained low-power state from the low-power configuration write request;
determining, using the information identifying the fine-grained low-power state and the low-power state capability information, a PCIe-defined low-power state that is mapped to the fined-grained low-power state; and
configuring the block or component on the PCIe device to enter the fine-grained low-power state instead of the PCIe-defined low-power state that is mapped to the fined-grained low-power state when the block or component or PCIe device detects a power-change event that signals the block or component to enter the PCIe-defined low-power state or when the block or component receives a command to enter the PCIe-defined low-power state.

3. The method of claim 1, wherein the one or more data structures includes a low-power state capability table structure having a first column storing PCIe-defined low-power states, a second column storing fine-grained low-power states, and one of more additional columns storing parameters relating to each fine-grained low-power state.

4. The method of claim 3, wherein the one or more data structures includes a plurality of configuration registers exposed to the host for selecting fine-grained low-power states, further comprising configuring one or more low-power configuration registers to identify a fine-grained low-power state a block or component on the PCIe device is to enter instead of a PCIe-defined low-power state associated with the fine-grained low-power state.

5. The method of claim 4, further comprising:
in response to a change to one or more configuration registers associated with a fine-grained low-power state,
configuring a block or component on the PCIe device to enter the fine-grained low-power state when the block or component or PCIe device detects a power-change event that signals the block or component to enter a PCIe-defined low-power state associated with the fine-grained low-power state or when the block or component receives a command to enter a PCIe-defined low-power state associated with the fine-grained low-power state.

6. The method of claim 3, further comprising:
generating, at the host, a low-power configuration read request to read low-power configuration information from the low-power state capability table structure;
sending the low-power configuration read request over the PCIe link to the PCIe device;
reading, at the PCIe device, low-power configuration information from the low-power state capability table structure;
returning the low-power configuration information that is read via a response that is sent from the PCIe device over the PCIe link to the host; and
creating or updating a data structure on the host containing low-power configuration information.

7. The method of claim 3, wherein the one of more additional columns storing parameters relating to each fine-grained low-power state includes a lower-power state auto-migration timer column in which timer values are stored that indicate an amount of time to spend in a fine-grained low-power state before automatically transitioning into a next lower power state.

8. The method of claim 7, wherein the PCIe device stores configuration information identifying whether lower-power state auto-migration is enabled for each of a plurality of fine-grained low-power states.

9. The method of claim 3, wherein the one or more additional columns storing parameters relating to each fine-grained low-power state includes a Scale column and a Value column, further comprising, for a given fine-grained low-power state, using values in the Scale and Value column for that fine-grained low-power state to determine an exit latency to be used for the fine-grained low-power state.

10. The method of claim 1, wherein the method is implemented by exchanging information between the host and the PCIe device using Vendor Defined Messages (VDMs) configured in accordance with a PCIe specification, or using Vendor-Specific Extended Capability (VSEC) transaction layer packets (TLPs) configured in accordance with a PCIe specification, and wherein the method is compliant with the PCIe specification.

11. A system comprising:
a System on a Chip (SoC) host including a plurality of processor cores interconnected to a memory controller, a Peripheral Component Interconnect Express (PCIe) root controller and at least one PCIe root port;
system memory, operatively coupled to the memory controller;
instructions, to execute on the SoC host; and
a PCIe device, including,
a PCIe port coupled to a PCIe root port via a PCIe link;
one or more data structures containing low-power state capability information mapping one or more fine-grained low-power states for each of at least one of an L0s, L1, L1.1, and L1.2 PCIe-defined low-power state; and
embedded logic;
wherein execution of the instructions on the SoC host and the embedded logic enable the system to,
configure, through use of the low-power state capability information, a block or component on the PCIe device to enter a fine-grained low-power state instead of an associated PCIe-defined low-power state mapped to the fine-grained low-power state when the PCIe device detects a power-change event or receives a command to enter the associated PCIe-defined low-power state.

12. The system of claim 11, wherein execution of the instructions on the SoC host and the embedded logic further enable the system to:
generate, at the host, a low-power configuration write request defining a fine-grained low-power state to be used by the PCIe device;
send the low-power configuration write request over the PCIe link to the PCIe device;
extract, at the PCIe device, information identifying the fine-grained low-power state from the low-power configuration write request;
determine, using the information identifying the fine-grained low-power state and the low-power state capability information, a PCIe-defined low-power state that is mapped to the fined-grained low-power state; and
configure the block or component on the PCIe device to enter the fine-grained low-power state instead of the PCIe-defined low-power state that is mapped to the fined-grained low-power state when the block or component or PCIe device detects a power-change event that signals the block or component to enter the PCIe-defined low-power state or when the block or component receives a command to enter the PCIe-defined low-power state.

13. The system of claim 11, wherein the one or more data structures includes a low-power state capability table structure having a first column storing PCIe-defined low-power states, a second column storing fine-grained low-power states, and one of more additional columns storing parameters relating to each fine-grained low-power state.

14. The system of claim 13, wherein the one or more data structures includes a plurality of configuration registers exposed to the host for selecting fine-grained low-power states, and wherein execution of the instructions on the SoC host and the embedded logic further enable the system to configure one or more low-power configuration registers to identify a fine-grained low-power state a block or component on the PCIe device is to enter instead of a PCIe-defined low-power state associated with the fine-grained low-power state.

15. The system of claim 14, the embedded logic further enables the PCIe device to:
in response to a change to one or more configuration registers associated with a fine-grained low-power state,
configure a block or component on the PCIe device to enter the fine-grained low-power state when the block or component or PCIe device detects a power-change event that signals the block or component to enter a PCIe-defined low-power state associated with the fine-grained low-power state or when the block or component receives a command to enter a PCIe-defined low-power state associated with the fine-grained low-power state.

16. The system of claim 13, wherein execution of the instructions on the SoC host and the embedded logic further enable the system to:
generate, at the host, a low-power configuration read request to read low-power configuration information from the low-power state capability table structure;
send the low-power configuration read request over the PCIe link to the PCIe device;
read, at the PCIe device, low-power configuration information from the low-power state capability table structure;
return the low-power configuration information that is read via a response that is sent from the PCIe device over the PCIe link to the host; and
create or update a data structure on the host containing low-power configuration information.

17. The system of claim 13, wherein the one of more additional columns storing parameters relating to each fine-grained low-power state includes a lower-power state auto-migration timer column in which timer values are stored that indicate an amount of time to spend in a fine-grained low-power state before automatically transitioning into a next lower power state.

18. The system of claim 17, wherein the PCIe device stores configuration information identifying whether lower-power state auto-migration is enabled for each of a plurality of fine-grained low-power states, and wherein the embedded logic on the PCIe device further enables the PCIe device to:
for a given power-level change event,
implement auto-migration to a next lower-power state for one or more lower-power states based on whether auto-migration is enabled for the one or more lower-power states.

19. The system of claim 13, wherein the one or more additional columns storing parameters relating to each fine-grained low-power state includes a Scale column and a Value column, and wherein execution of the instructions on the SoC host and the embedded logic further enable the system to:
for a given fine-grained low-power state, calculate an exit latency to be used for the fine-grained low-power state as a function of values in the Scale and Value columns for that fine-grained low-power state to.

20. The system of claim 11, wherein the SoC host and the PCIe device are configured to exchange information using Vendor Defined Messages (VDMs) configured in accordance with a PCIe specification, or using Vendor-Specific Extended Capability (VSEC) transaction layer packets (TLPs) configured in accordance with a PCIe specification.

21. A Peripheral Component Interconnect Express (PCIe) device, comprising:
a PCIe port configured to implement a PCIe stack including a physical layer (PHY), link layer, and transaction layer, the physical layer implemented in a PHY block;
one or more data structures containing low-power state capability information mapping one or more fine-grained low-power states for each of at least one of an L0s, L1, L1.1, and L1.2 PCIe-defined low-power state; and
embedded logic;
wherein the PCIe device is configured to be coupled to a host via a PCIe link coupled between the host and the PCIe port, and wherein the embedded logic is configured to,
configure, through use of the low-power state capability information, a block or component on the PCIe device to enter a fine-grained low-power state instead of an associated PCIe-defined low-power state mapped to the fine-grained low-power state when the block or component or PCIe device detects a power-change event that signals the block or component to enter the PCIe-defined low-power state or when the block or component receives a command to enter the PCIe-defined low-power state.

22. The PCIe device of claim 21, wherein the embedded logic is further configured to:
- receive, at the PCIe port from the host, a low-power configuration write request defining a fine-grained low-power state to be used by the PCIe device
- extract information identifying the fine-grained low-power state from the low-power configuration write request;
- determine, using the information identifying the fine-grained low-power state and the low-power state capability information, a PCIe-defined low-power state that is mapped to the fined-grained low-power state; and
- configure the block or component on the PCIe device to enter the fine-grained low-power state instead of the PCIe-defined low-power state that is mapped to the fined-grained low-power state when the block or component or PCIe device detects a power-change event that signals the block or component to enter the PCIe-defined low-power state or when the block or component receives a command to enter the PCIe-defined low-power state.

23. The PCIe device of claim 21, wherein the one or more data structures include:
- a low-power state capability table structure having a first column storing PCIe-defined low-power states, a second column storing fine-grained low-power states, and one of more additional columns storing parameters relating to each fine-grained low-power state; and
- a plurality of configuration registers exposed to the host for selecting fine-grained low-power states, and wherein the embedded logic further is configured to enable, via communication with the host over the PCIe link, the host to configure one or more low-power configuration registers to identify a fine-grained low-power state a block or component on the PCIe device is to enter instead of a PCIe-defined low-power state associated with the fine-grained low-power state.

24. The PCIe device of claim 23, further comprising a power management unit in which a portion of the embedded logic is implemented, wherein the embedded logic is further configured to:
- in response to a change to one or more configuration registers associated with a fine-grained low-power state,
- trigger the power management unit to configure a block or component on the PCIe device to enter the fine-grained low-power state when the block or component or power management unit detects a power-change event that signals the block or component to enter a PCIe-defined low-power state associated with the fine-grained low-power state or when the block or component receives a command from the power management unit to enter a PCIe-defined low-power state associated with the fine-grained low-power state.

25. The PCIe device of claim 21, wherein the block or component on the PCIe device configured to enter the fine-grained low-power state instead of the associated PCIe-defined low-power state mapped to the fine-grained low-power state is the PHY block.

* * * * *